United States Patent [19]
Gebauer et al.

[11] Patent Number: 5,597,059
[45] Date of Patent: Jan. 28, 1997

[54] FLYWHEEL ASSEMBLY FOR A MOTOR VEHICLE, THE FLYWHEEL ASSEMBLY HAVING A GAP SEAL

[75] Inventors: Andreas Gebauer; Joachim Lindner, both of Schweinfurt; Bernhard Schierling, Kürnach, all of Germany; Bernd Stockmann, Troy, Mich.; Jörg Sudau, Niederwerrn, Germany

[73] Assignee: Fichtel & Sachs AG, Schweinfurt, Germany

[21] Appl. No.: 391,049

[22] Filed: Feb. 21, 1995

[30] Foreign Application Priority Data

Feb. 19, 1994 [DE] Germany .......................... 44 05 384.3

[51] Int. Cl.$^6$ .............. F16D 13/60; F16D 3/14; F16J 15/44; F16F 15/16
[52] U.S. Cl. .................... 192/70.12; 74/574; 192/70.17; 192/113.23; 192/208; 464/68
[58] Field of Search ................. 192/113.23, 113.24, 192/70.12, 70.17, 55.4, 208; 74/574; 464/66, 68, 17

[56] References Cited

U.S. PATENT DOCUMENTS

| | | | |
|---|---|---|---|
| 4,946,420 | 8/1990 | Jackel | 74/574 X |
| 5,042,632 | 8/1991 | Jackel | 74/574 X |
| 5,125,872 | 6/1992 | Reik | 74/574 X |
| 5,156,249 | 10/1992 | Friedmann . | |

FOREIGN PATENT DOCUMENTS

| | | | |
|---|---|---|---|
| 60262 | 10/1954 | France | 192/113.24 |
| 2587075 | 3/1987 | France . | |
| 2688846 | 9/1993 | France . | |
| 3630398 | 5/1987 | Germany . | |
| 4127438 | 3/1993 | Germany . | |
| 2193789 | 2/1988 | United Kingdom . | |
| 2234574 | 2/1991 | United Kingdom . | |
| 2251284 | 7/1992 | United Kingdom . | |
| 2258713 | 2/1993 | United Kingdom . | |

*Primary Examiner*—Rodney H. Bonck
*Attorney, Agent, or Firm*—Nils H. Ljungman and Associates

[57] ABSTRACT

A flywheel assembly has a first flywheel which is detachably connected to the crankshaft of a combustion engine, a second flywheel which can be rotated relative to the first, and a torque transformer, such as a hub disc, which is located in a chamber between the two flywheels, which chamber is filled with a viscous medium and which torque transformer is equipped with a torsion damping unit. The chamber is defined on that side facing the second flywheel by a cover plate, which encloses an air channel between it and the second flywheel, which air channel extends radially outward from a ventilation opening in the second flywheel. The torque transformer is provided radially outward from the ventilation opening with an annular surface, which annular surface extends preferably in the axial direction. The cover plate extends with its radially inward end in the radial direction to the annular surface and in the axial direction to the radially outer portion of the torque transformer, whereby the annular surface defines the maximum radial distance from the torque transformer to the ventilation opening for the change of direction of the air channel.

18 Claims, 12 Drawing Sheets

5,597,059

FLYWHEEL ASSEMBLY FOR A MOTOR VEHICLE, THE FLYWHEEL ASSEMBLY HAVING A GAP SEAL

BACKGROUND OF THE INVENTION

1. Field of the Invention

The present invention generally relates to a flywheel assembly, the flywheel assembly having a first flywheel or a first flywheel mass which is detachably connected to the crankshaft of a combustion engine, a second flywheel or a second flywheel mass which can be rotated relative to the first flywheel, and a torque transformer. The torque transformer can be, for example, a hub disc equipped with a torsion damping unit. The flywheel assembly can also include a chamber filled with a viscous medium, which chamber can be located between the two flywheels. The hub disc can be located in this chamber. Further, the chamber can be defined on a side facing the second flywheel by a cover plate, which cover plate defines an air channel between the cover plate and the second flywheel, the air channel extending substantially radially outward from an axial ventilation opening in the second flywheel.

2. Background Information

An example of one such flywheel assembly can be found in German Patent No. 36 30 398 A1, which discloses a flywheel assembly with two flywheels which can be rotated relative to one another. Between the two flywheels there is a hub disc which acts as a torque transformer, on which torque transformer torsion damping units are located. The hub disc rotates in a chamber filled with a viscous medium, and the chamber is defined by the first flywheel and a cover plate fastened to the first flywheel. The cover plate rests with axial prestress or bias against a seal in the vicinity of the radially inside end of the cover plate, so that the viscous medium is prevented from escaping from the chamber. Further, dust particles, which dust particles are sucked in through a ventilation opening in the second flywheel when the flywheels are spinning, are unable to enter the chamber filled with viscous medium. The air sucked in through the ventilation opening is removed via an air duct which runs radially outward between the cover plate and the second flywheel.

Because the cover plate rests with axial prestress against the seal, relative motion between the two flywheels generally results in friction between the cover plate and the seal, which friction in turn can lead to wear of the seal so that, after a certain amount of wear, the seal can essentially no longer perform its function properly. If the seal is not replaced promptly, the escape of viscous medium from the chamber, and the penetration of dust particles into the chamber, are essentially unavoidable.

OBJECT OF THE INVENTION

The object of the present invention is to design that region of a flywheel assembly at which it is possible for the viscous medium to escape, as well as for dust particles to enter, so that the chamber enclosed by the hub disc essentially does not allow the escape of viscous medium from the chamber or the penetration of dust particles into the chamber, even after long periods of operation with essentially no maintenance.

SUMMARY OF THE INVENTION

This object can preferably be achieved by providing the torque transformer with an annular surface, which annular surface preferably extends in the axial direction and, providing the torque transformer, relative to the second flywheel, with a portion which lies radially outside the annular surface. This radially outside portion of the torque transformer can preferably be recessed in relation to the annular surface. The cover plate can preferably have a radially inner end which extends in the radial direction towards the annular surface, and in the axial direction extends towards the radially outer portion of the torque transformer. The annular surface of the torque transformer can preferably determine the maximum radial distance from the torque transformer to the ventilation opening for the change of direction of the air channel.

By moving the cover plate toward the annular surface of the torque transformer, which torque transformer can preferably be realized, for example, in the form of a hub disc or a cover plate operationally connected to the hub disc, a gap seal can be formed. The gap seal can preferably prevent a viscous medium from escaping the chamber enclosed by the torque transformer and the cover plate. The gap seal can also prevent dust particles, which dust particles can be sucked in through a ventilation opening in the second flywheel when the flywheels are spinning, from entering the chamber filled with viscous medium.

In order to prevent the dust particles from accumulating on the outside of the gap seal, the direction of the air channel can preferably be modified so that the direction of the air stream, and thus the direction of the flow of dust particles in the air, is such that the dust particles are carried away from the gap seal. This change of direction should take place within the radially inner region of the torque transformer, if possible, so that the current of air is essentially already oriented in the new direction of flow when it passes the gap seal. However, the flow of air in the air channel can also be redirected after the stream of air reaches the gap seal.

An additional feature, by means of which the accumulation of dust particles at the gap seal can essentially be prevented, is that the portion of the torque transformer which is located radially outside the annular surface can be axially recessed, with respect to the second flywheel, thereby making possible a recessed configuration of the cover plate with respect to the outside portion of the torque transformer. As a result of this axial offset or recess of the torque transformer, the gap seal between the cover plate and the torque transformer can preferably be shifted from a region through which the air in the air channel flows as is shown in German Patent No. 36 30 398 A1, to an area of the flywheel assembly through which there is essentially no flow of air, and which area can essentially not be reached by the dust particles located on the edge of the air stream and removed from the air current by means of the turbulence acting on this edge or peripheral region of the air stream.

As a result of the configuration of the air channel in accordance with the present invention, the cross-section of the air channel can preferably be reduced upstream, or radially inward, from the gap region. This cross-section reduction can preferably act as a jet to increase the flow velocity of the air stream. Accelerated in this manner, the air current will essentially flow past the gap seal in that area of the air channel in which, on account of the recessed location of the outer portion of the torque transformer and of the cover plate, there is an enlargement of the cross section compared to the nozzle area. The air stream or current will essentially only come in contact again with the wall formed by the cover plate behind, or downstream of the gap seal. Accordingly, the dust particles can essentially not reach the gap seal.

As long as the flow velocity of the air in the jet is below the speed of sound, the air current will essentially continue to behave as described above when passing through the jet, as well as upon exiting the jet. The change in direction of the air gap can then occur preferably upstream, or radially inward, of the gap seal. If the flow velocity in the jet is equal to or greater than the speed of sound, however, the flow velocity is increased again as the air exits the jet, whereby dust particles can preferably come into contact with the cover plate a relatively great distance downstream of the gap seal, preferably by means of an additional configuration of the area adjacent the annular surface.

A particular angular range can be specified for a change in direction of the air current in the direction of flow to the second flywheel, in which angular range the flow connections in the air current reach an optimum in relation to the area of the gap seal. Also of advantage for the flow conditions is a configuration of the air channel such that the distance between the ventilation opening and the point at which a shoulder on the hub disc extends toward the inner portion of the torque transformer is a specified minimum distance, since here the current can be directed past the area of the gap seal essentially without turbulence.

In accordance with an additional embodiment of the present invention, the annular surface, to which the radial end of the cover plate preferably extends to within the width of the gap, can be achieved by means of the recessed position of the outer region of the torque transformer, compared to the inner region of the torque transformer. Interacting with this annular surface, the cover plate can preferably perform its function particularly well if its radially inner end forms an acute angle, or if the radially inner end has a gap seal which follows the contour of the annular surface.

In accordance with one preferred embodiment of the present invention, the air current can be steadily accelerated at least as much as is required to offset a loss of velocity resulting from frictional forces, in particular near the walls of the torque transformer and the second flywheel.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a flywheel assembly for an internal combustion engine of a motor vehicle for transmitting mechanical rotary power from an internal combustion engine to a transmission, the flywheel assembly comprising: a first flywheel portion; a second flywheel portion disposed adjacent the first flywheel portion; the first flywheel portion comprising means for non-rotationally connecting the first flywheel portion to a crankshaft of an internal combustion engine; the first flywheel portion being rotatable about an axis of rotation, the axis of rotation defining an axial direction parallel to the axis of rotation; the second flywheel portion being rotatable about the axis of rotation; hub disc means for connecting together the first flywheel portion and the second flywheel portion, for rotating the second flywheel portion with the first flywheel portion; a cover plate disposed between the second flywheel portion and the hub disc means, the cover plate comprising an outer circumferential portion and an inner circumferential portion, the inner circumferential portion being disposed immediately adjacent the hub disc means; the first flywheel portion and the cover plate defining a chamber therebetween, at least a portion of the chamber comprising a viscous medium; at least a portion of the hub disc means being disposed within the chamber; the cover plate, the second flywheel portion and the hub disc means together defining an air channel; and the hub disc means further comprising means for deflecting the air in the air channel away from the inner circumferential portion of the cover plate.

BRIEF DESCRIPTION OF THE DRAWINGS

The present invention is described in greater detail below with reference to the embodiments illustrated in the accompanying drawings, in which.

DESCRIPTION OF THE PREFERRED EMBODIMENT

Figure 1:
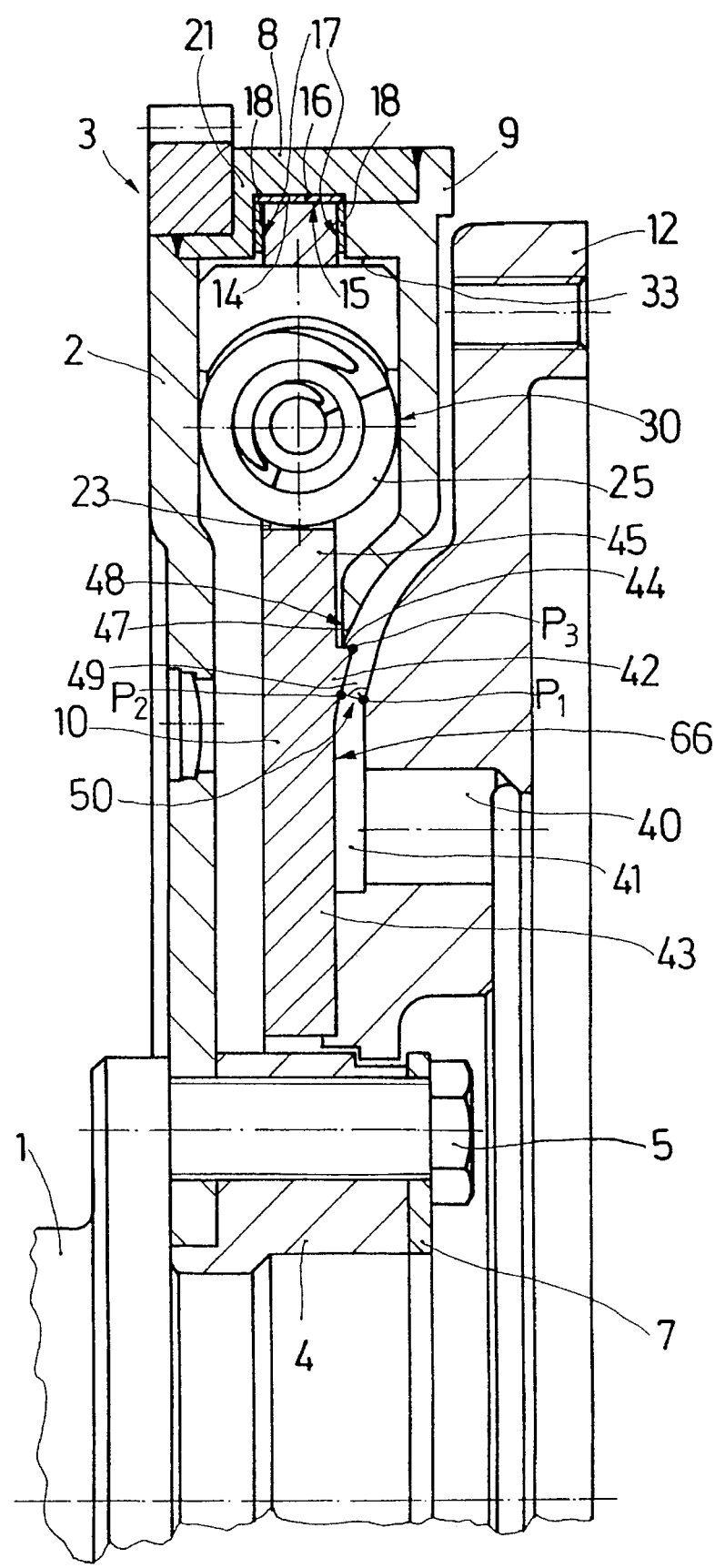
FIG. 1 shows a longitudinal section of a flywheel assembly having an air channel with a jet, which channel leads radially outward from a ventilation opening and is defined on the hub side by a cover plate.
Figure 1A:
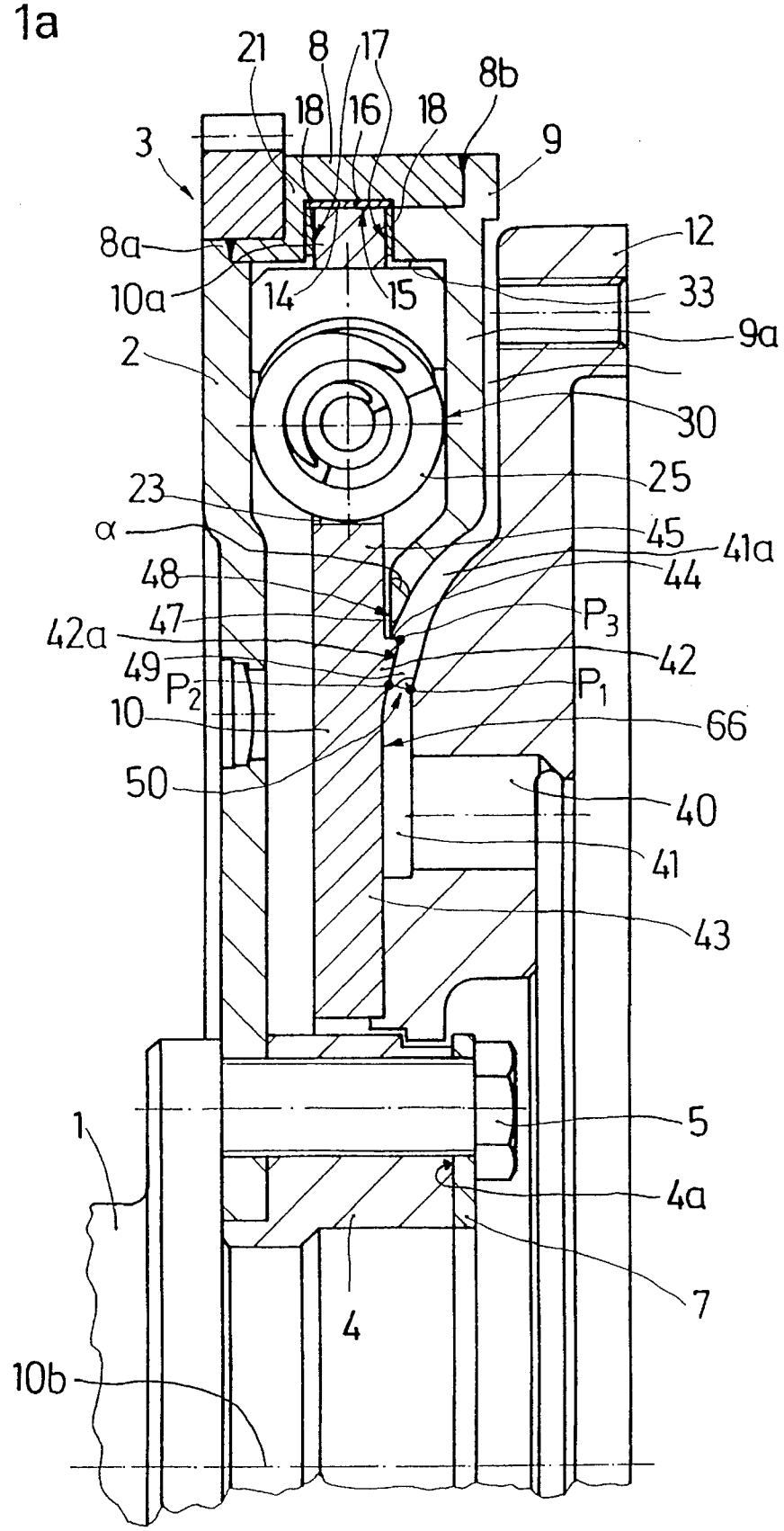
FIG. 1a shows substantially the same view as FIG. 1, but shows additional details.

FIGS. 1 and 1a show a partial longitudinal section through a flywheel assembly generally including a primary plate 2 of a flywheel 3 and a mounting flange 4. The primary plate 2 of the flywheel 3 and the mounting flange 4 can preferably be fastened by means of bolts or screws 5 onto a crankshaft 1 of a motor vehicle. Located between the mounting flange 4 and the heads of the screws 5, which screws 5 can preferably be distributed around the circumference of the mounting flange 4, is a plate 7, which plate 7 can preferably distribute the forces exerted by the heads of the screws 5 to a contact surface 4a (see FIG. 1a) of the mounting flange 4.

The primary plate 2 of the flywheel 3 can preferably have an annular primary carrier 8 in its outer circumferential region. In accordance with one embodiment, the primary carrier 8 can preferably be fastened to the primary plate 2 by means of a weld 8a (see FIG. 1a). A cover plate 9 can be fastened to an end of the primary carrier 8 which faces away from the primary plate 2, preferably by means of an additional weld 8b (see FIG. 1a). In accordance with one embodiment of the present invention, the primary carrier 8 can preferably have a radial portion 21 disposed adjacent recess 14. The first flywheel 3 preferably has a chamber 33 enclosed by the primary plate 2, primary carrier 8, and cover plate 9. A torque transformer 66, preferably in the form of a hub disc 10, can preferably be located in the chamber 33 and can be connected to a second flywheel 12. A clutch housing and an associated friction clutch with a clutch plate can also be connected to the flywheel 12 in a manner not shown here but see FIG. 6.

The radial dimension of the hub disc 10 can preferably be chosen so that an outer circumferential portion 10a (see FIG. 1a) of the hub disc 10 engages in a recess 14, which recess 14 can be located on the inside of the primary carrier 8. The recess 14 can preferably contain a radial bearing 15, which bearing 15 can preferably be in the form of a ring or band 16 which follows the inner contour of the primary carrier 8, and axial bearings 17, also preferably in the form of a ring. The axial bearing 17 can preferably have limit stops 18 on each side of the hub disc 10.

In addition, there can preferably be recesses 23 in the hub disc 10, which recesses 23 can contain springs 25. The springs 25 preferably brace the primary plate 2 and the cover plate 9 in relation to the hub disc 10 in a manner not shown here. The springs 25 and a viscous medium such as grease, which medium can preferably be displaced when the springs 25 deform, can be part of a torsion damping system 30.

In accordance with one embodiment of the present invention, since the secondary flywheel 12 is rigidly connected to the radially inner portion of the hub disc 10, the flywheel 12 is essentially mounted to rotate with hub disc 10 against the force of the springs 25, which springs 25 can be coil springs. The flywheel 12 can preferably be supported in relation to the primary plate 2 by means of the hub disc 10 and the radial and axial bearings 15, 17 discussed above.

There can preferably be at least one ventilation opening 40 in the secondary flywheel 12, wherein if more than one opening 40 is provided, the openings 40 can preferably be equally spaced about the axis of rotation 10b. From the opening 40 an air channel 41 can preferably lead essentially radially outward. On the side of the hub disc 10 facing the second flywheel 12, radially outside of the ventilation opening 40, there can preferably be a shoulder 42, which shoulder 42 extends at an angle with respect to a radially inner portion 43 of the hub disc 10, designated the hub interior 43 below for short. The shoulder 42 can preferably have an annular surface 44 at a radially outer end of the shoulder 42, which annular surface 44 preferably runs nearly parallel to an axis of rotation 10b (see FIG. 1a) of the hub disc 10. The cover plate 9 can preferably have a radially inner end 47, which inner end 47 can form an acute angle (alpha) as shown in FIG. 1a. In accordance with one embodiment, the inner end 47 of cover plate 9 can preferably extend in the radial direction towards the annular surface 44, wherein there can preferably be a radial gap between surface 44 and end 47. Alternatively, the inner end 47 can preferably contact annular surface 44. The inner end 47 can also preferably extend in the axial direction toward a radially outer portion 45 of the hub disc 10, designated the outer part 45 of the hub disc 10 below. In accordance with one embodiment, there can preferably be an axial gap between outer portion 45 and the surface portion of the inner end 47, which surface portion preferably faces portion 45.

Together with the outer part 45 of the hub disc 10 and the annular surface 44 of the hub disc 10, the end 47 of the cover plate 9 can preferably form a gap seal 48. The gap seal 48 can preferably prevent the escape of viscous medium, such as grease, from the chamber 33, as well as the penetration of dust particles into the chamber 33.

Since the inner end 47 of the cover plate 9, as mentioned above, preferably approaches, and possibly slightly engages, the annular surface 44 of the hub disc 10 essentially directly adjacent to the outer part 45 of the hub, the cover plate 9 can preferably be located behind the front edge of the shoulder 42, due to the recessed position of the outer part 45 of the hub disc 10. In other words, and in accordance with one embodiment of the present invention, the end 47 of cover plate 9 can preferably be located axially inward, i.e. towards primary plate 2, along surface 44, since the hub disc 10 is preferably recessed at its outer part 45. This measure can preferably achieve the following. The air channel 41, or at least a portion of the air channel 41, preferably extends between the ventilation opening 40 and the shoulder 42, essentially parallel to the longitudinal direction of the hub disc 10. By means of the shoulder 42, the air channel 41, on the side of the hub disc 10, is preferably deflected radially outward, about 5 to 10 degrees in the direction of the flywheel 12 on the one hand, and the air channel 41 is preferably constricted, on the other hand, since that side of the air channel 41 facing the flywheel 12 is radially farther to the outside. The side of the air channel 41 facing the flywheel 12 is radially farther to the outside primarily in the region between the point at which the shoulder 42 extends from the hub disc 10 and the annular surface 44. In a projection of a point P1, point P1 preferably being a point on the flywheel 12 where the change in direction of the air channel 41 occurs, perpendicular to the new direction of the air channel 41 on the flywheel 12, to the hub disc 10, a point P2 is reached. Point P2 is preferably located on the shoulder 42, which shoulder 42 protrudes at an angle relative to the hub disc 10, and is located upstream of a point P3, point P3 being the point where the angled region of the shoulder 42 reaches the annular surface 44. The constriction of the air channel 41 can thus preferably act as a jet 50 for the air flowing through the air channel 41, whereby the air current can be accelerated.

In other words, and in accordance with one embodiment of the present invention, the air in the air channel 41 can preferably be guided by means of shoulder 42. On one hand, the shoulder 42 can guide the air in air channel 41 radially outward, i.e. towards primary carrier 8. On the other hand, the shoulder 42 can preferably have an angled surface 42a (see FIG. 1a), which surface 42a can deflect the air in air channel 41 axially, towards the flywheel 12 away from the juncture of surface 44 and end 47. This angled surface 42a can be disposed at an angle of about 5°, 6°, 7°, 8°, 9°, 10°, 11°, 12°, 13°, 14°, 15°, 16°, 17°, 18°, 19°, or 20°, with respect to the radially inner portion 43 of hub disc 10, the surface 42a being angled in the direction of the flywheel 12. It is preferable, however, that the angled surface 42a be disposed between 4° and 10°. This axial deflecting of the air by the angled surface 42a of the shoulder 42 can be explained using the points P1, P2 and P3. Point P1 can be considered to be the point on the flywheel 12 at which the direction of the air channel 41 changes. Thus, the flywheel 12 can preferably be configured with this special contour which begins at point P1. In order to locate point P2, a first straight line can preferably be drawn which intersects point P1 and extends along this contour of the flywheel 12, A second straight line intersecting point P1 can then be drawn which is perpendicular to the first line, the second line extending until the angled surface 42a of the shoulder 42 is reached. This intersection with surface 42a of shoulder 42 can preferably be the location of point P2. The point P3 can preferably be considered to represent the outermost edge of surface 44, i.e. where the angled surface 42a and surface 44 meet. The points P1, P2 and P3 can together represent at least a partial outline of a constricted area 49 of air channel 41, which area 49 can preferably act as jet 50, as discussed above.

Because of the recessed position of the cover plate 9, preferably due to the recessed position of the outer portion 45 of the hub disc 10, the air channel 41 can preferably widen again in the vicinity of the annular surface 44 of the shoulder 42, at which point the air current becomes wider and can be guided along the cover plate 9. In accordance with one embodiment, the air channel 41 can preferably widen in an area 41a (see FIG. 1a), which area 41a is located in the vicinity of surface 44. Because of the high flow velocity of the air as it exits the jet 50, the air preferably does not begin flowing along the cover plate 9 immediately behind the annular surface 44, and thus in the gap seal 48 region, but only some distance behind this region, i.e. downstream of the gap seal 48 towards primary carrier 8. Since dust particles associated with the air current are carried along with the air current, the dust particles essentially only come into contact with the cover plate 9 relatively far downstream of the gap seal 48, and consequently will typically not be deposited in the gap seal 48 region. The gap seal region 48 can thus be kept virtually free of dust particles.

Downstream of the gap seal 48, the air channel 41 preferably gradually constricts as it extends radially outward so the air stream is steadily accelerated, at least as much as is required to offset a loss of velocity resulting from frictional forces, in particular near the walls. In accordance with one embodiment, the air channel 41 can preferably become constricted once again in an area 41b (see FIG. 1a), wherein area 41b can be located between an outer portion 9a (see FIG. 1a) of the cover plate 9 and the second flywheel 12.

Figure 2:
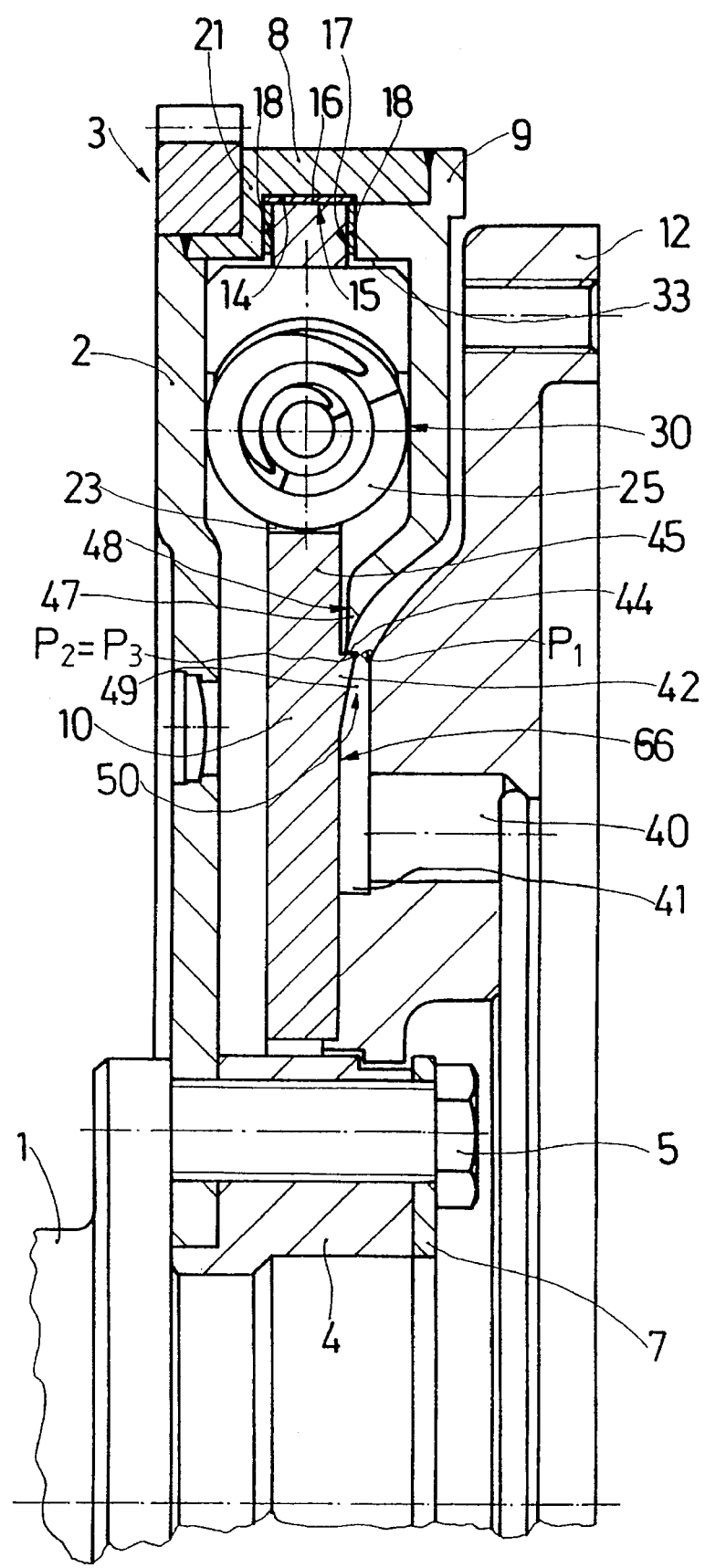
FIG. 2 shows an additional embodiment similar to that shown in FIGS. 1 and 1a, in which a ventilation opening is provided for flow velocities up to and including the speed of sound.
Figure 2A:
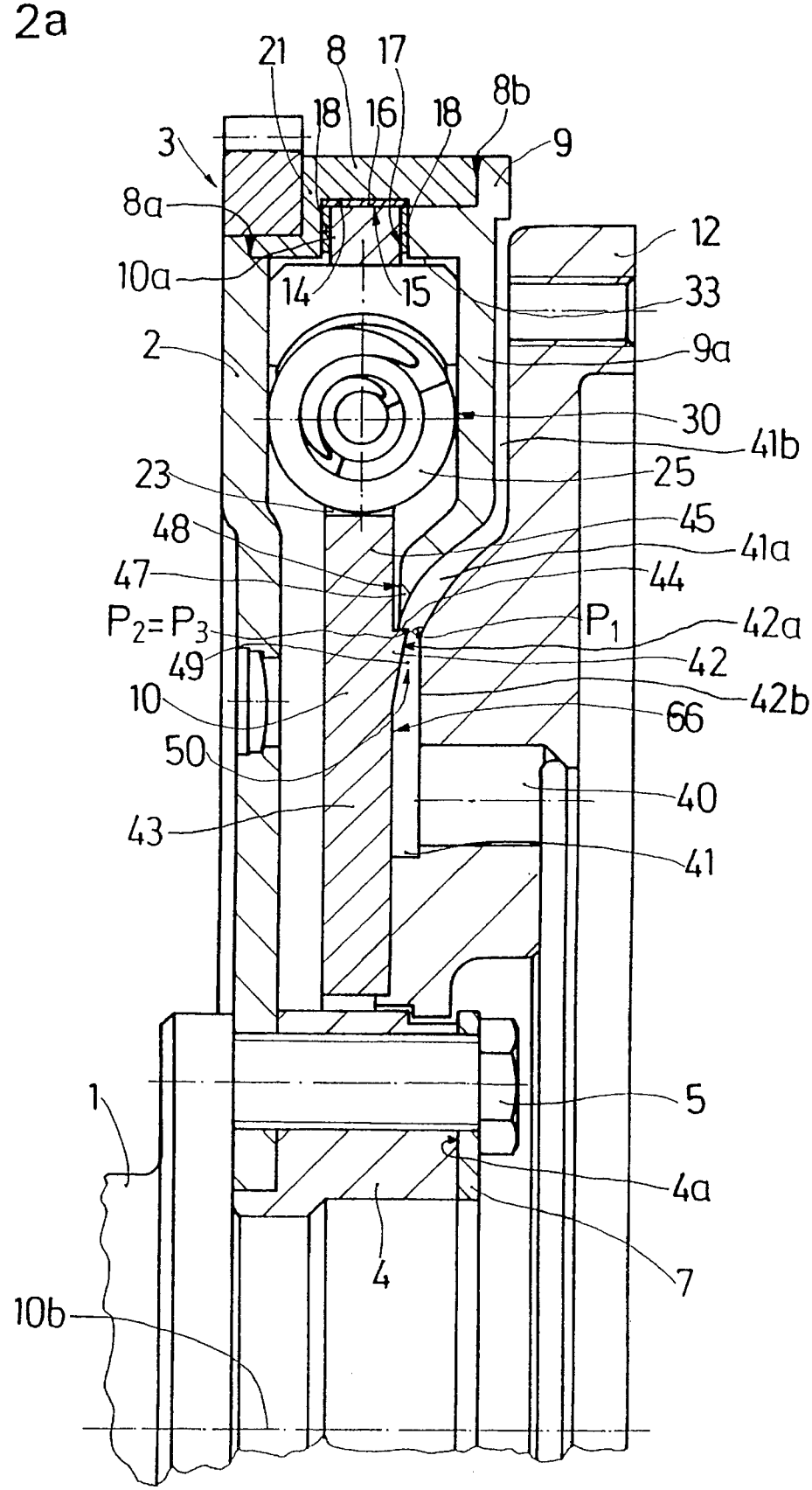
FIG. 2a shows substantially the same view as FIG. 2, but shows additional details.

The configuration of the air channel 41 described above should preferably be used if the air flow velocity upon exiting the jet 50 is below the speed of sound. If, on the other hand, the air flow velocity reaches the speed of sound, the course of the air channel 41 could be modified as shown in FIGS. 2 and 2a, so that, from the point of the change of direction of the air channel 41 on hub disc 10, the air channel 41 preferably extends further radially outward from the hub disc 10, namely at a point P1 on the flywheel 12 at which a projection to the hub disc 10 from the point P1 perpendicular to the course of the air channel 41, after the change in direction, precisely coincides with point P3. Point P3 can preferably be the point at which the angled portion 42a of the shoulder 42 adjoins the annular surface 44 of the shoulder 42.

In other words, and in accordance with one embodiment of the present invention, a surface 42b (see FIG. 2a) of the flywheel 12 can preferably be extended radially further outward, as compared to the embodiments shown in FIGS. 1 and 1a so that the point P1 (the change in direction point) is further from the axis 10b. Thus, point P1 is preferably further radially outward in FIGS. 2 and 2a than in FIGS. 1 and 1a, thereby causing passage 41 to be more constricted. The angle of the angled surface 42a, with respect to the inner radial portion 43 of hub disc 10, can preferably be between about 5° and 20°. By extending the surface 42b of the flywheel 12, the air channel 41 can be further constricted in area 49, as compared to the embodiments of the air channel 41 shown in FIGS. 1 and 1a. Again, describing the deflecting of the air in air channel 41 in terms of points P1, P2 and P3, point P1 can be considered to be the point on the flywheel 12 at which the air channel 41 changes direction. Point P2 can be determined in the same manner as discussed above with regard to FIGS. 1 and 1a, that is, by drawing a first straight line through point P1 and along the contoured surface of flywheel 12, and then drawing a second straight line through point P1, which second straight line is perpendicular to the first line, until angled surface 42a is reached. In this embodiment, points P2 and P3 can preferably coincide with one another, P2 being the projection of point P1, and point P3 being the point where angled surface 42a (see FIG. 2a) and surface 44 meet one another.

Since the air current has a flow velocity comparable to the speed of sound when exiting this extreme jet 50, the air current can be further accelerated because of the laws of physics governing a current of air travelling at more than the speed of sound. The air current, and thus the dust particles carried in it, therefore essentially only come in contact with the cover plate 9 at a point which is radially far outside the gap seal 48. Further, in accordance with one embodiment, the air channel 41 can preferably widen in the area 41a upstream from area 49, and can constrict once again in radially outward area 41b, similar to the embodiments shown in FIGS. 1 and 1a.

Independent of the air flow velocity in the embodiments depicted in FIGS. 1, 1a, 2 and 2a, care should be taken when designing the air channel 41 so that there is a sufficient distance between the ventilation opening 40 and the jet 50, so that the air current can enter the jet 50 as free of turbulence as possible.

Further, in accordance with one embodiment, the end 47 of cover plate 9 can preferably extend radially towards surface 44, and can make contact with surface 44, or alternatively there can be a radial gap between end 47 and surface 44.

Figure 3:
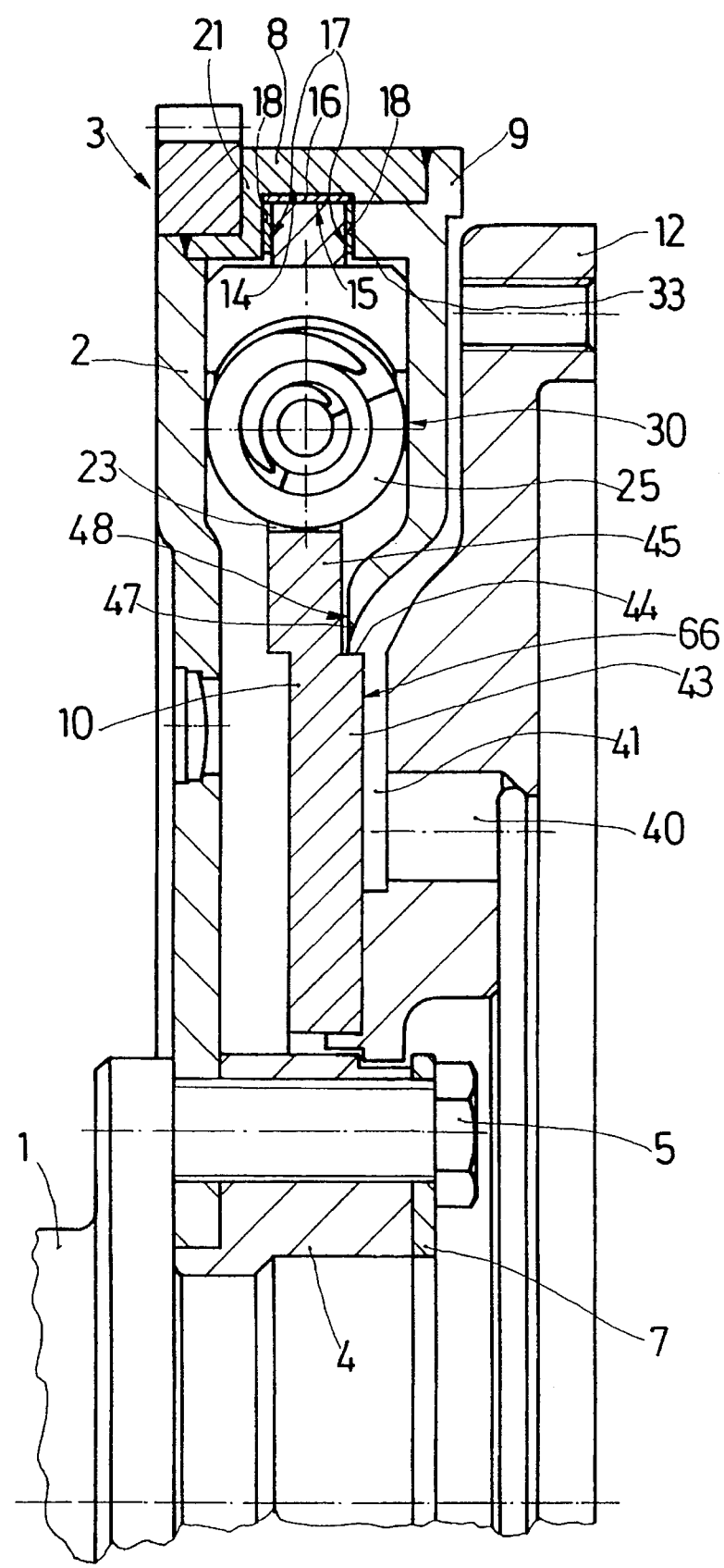
FIG. 3 shows an additional embodiment similar to that shown in FIGS. 1–2a, but without the use of a jet in the air channel.
Figure 3A:
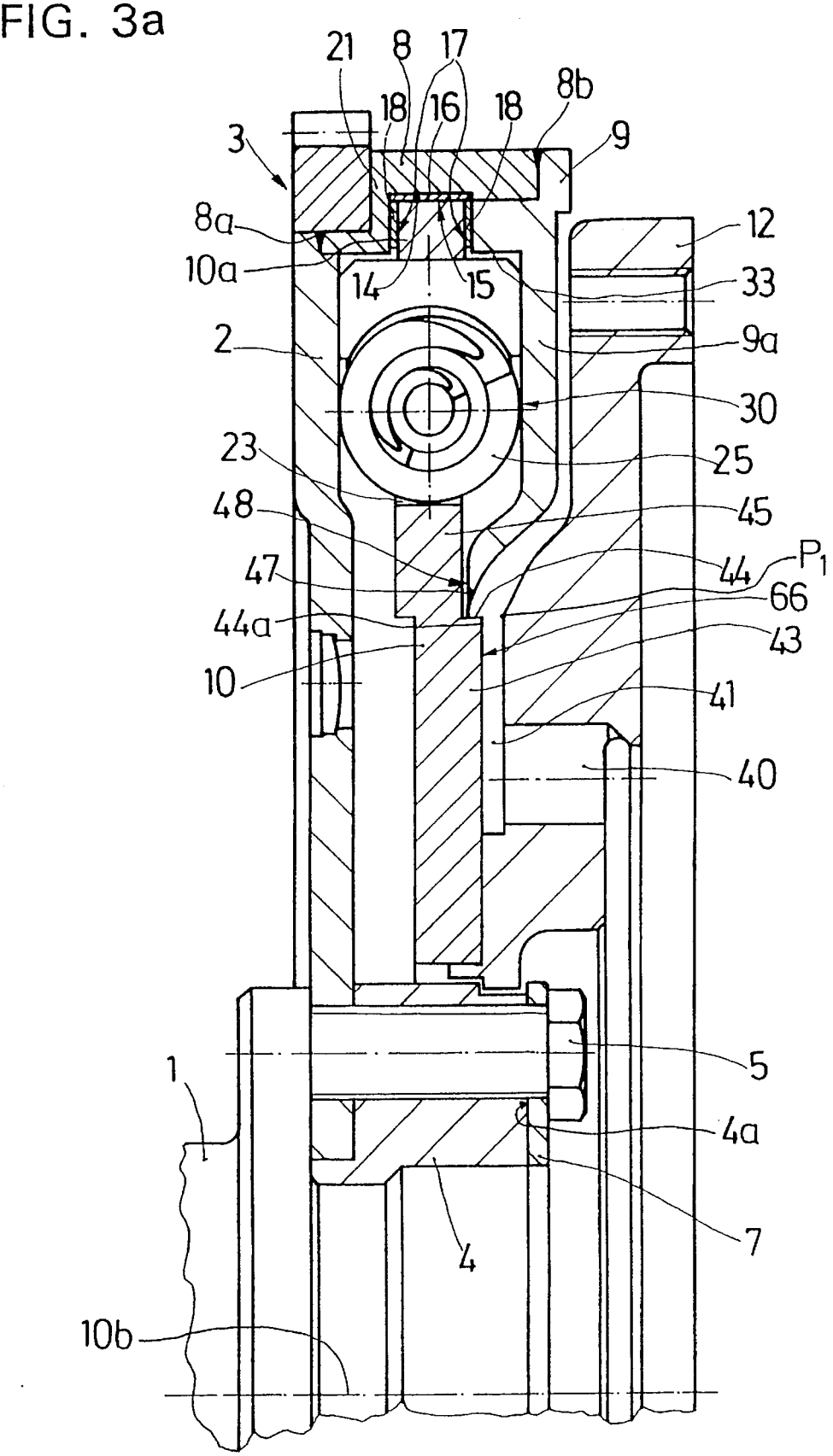
FIG. 3a shows substantially the same view as FIG. 3, but shows additional details.

FIGS. 3 and 3a show an embodiment in which, instead of the shoulder 42 forming the annular surface 44 opposite the hub exterior 45, as shown in FIGS. 1–2a, the hub interior 43 is preferably moved forward in the direction of the second flywheel 12. Because the shoulder 42, which shoulder 42 protrudes at an angle relative to the hub disc 10, has essentially been eliminated, there is essentially no constriction of cross section of the air channel 41 in this embodiment, and thus no jet 50 for acceleration of the air. To prevent the air channel 41 from expanding upstream, i.e. towards opening 40, of the gap seal 48, the change in direction of the air channel 41 on the side facing the second flywheel 12 essentially only occurs at the point of the gap seal 48. In other words, and in accordance with one embodiment of the present invention, the point P1 (see FIG. 3a) on flywheel 12 at which the air channel 41 changes direction can preferably be located opposite a point 44a (see FIG. 3a) of surface 44, point 44a being comparable to point P3 of FIGS. 1–2a.

Further, in accordance with one embodiment, the end 47 of cover plate 9 can preferably extend towards surface 44 and can make contact with surface 44, or alternatively there can be a radial gap between end 47 and surface 44.

The further configuration of the flywheel assembly shown in FIGS. 3 and 3a can preferably be similar to that shown in FIGS. 1–2a, and will therefore not be discussed further here.

Figure 4:
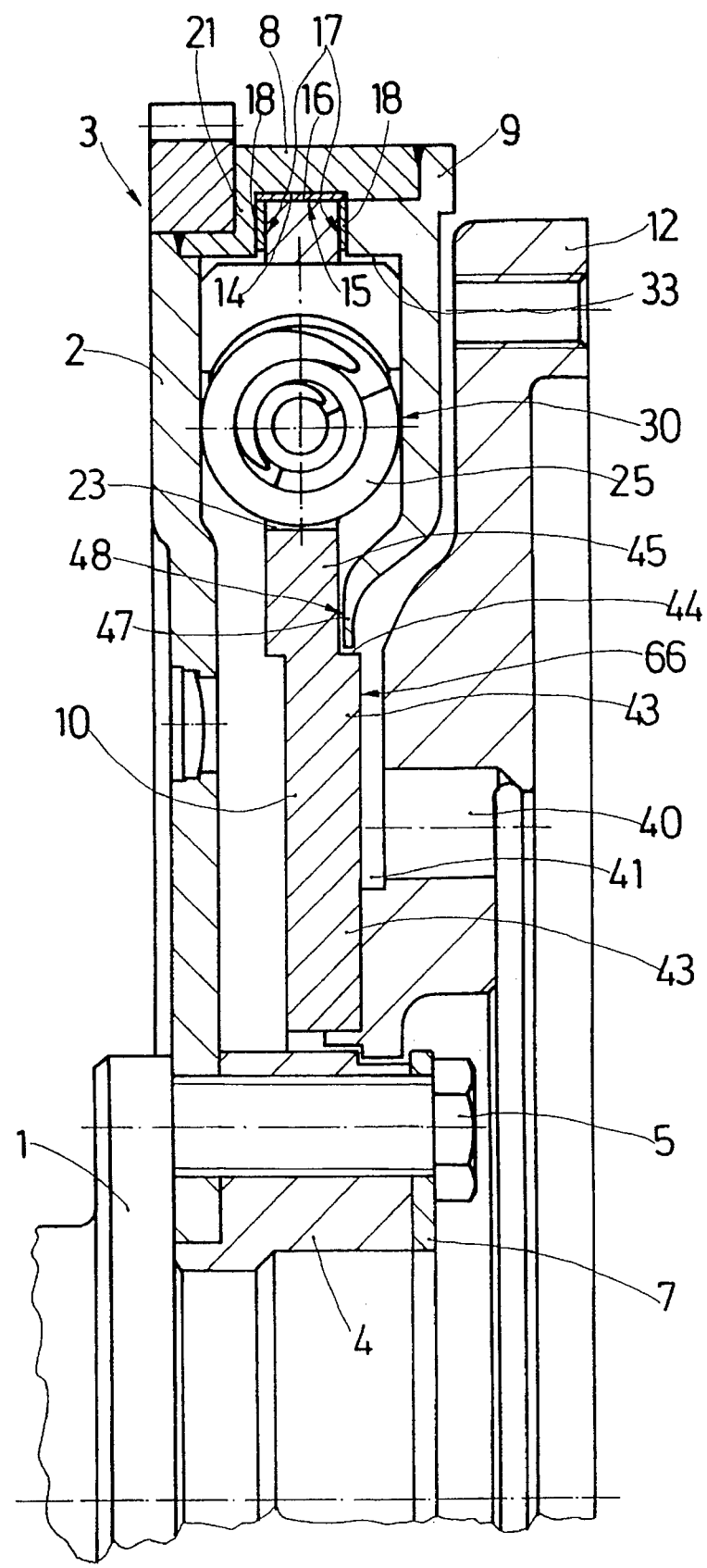
FIG. 4 shows an additional embodiment similar to that shown in FIGS. 3 and 3a, but with a different configuration of the radial inner end of the cover plate.
Figure 4A:
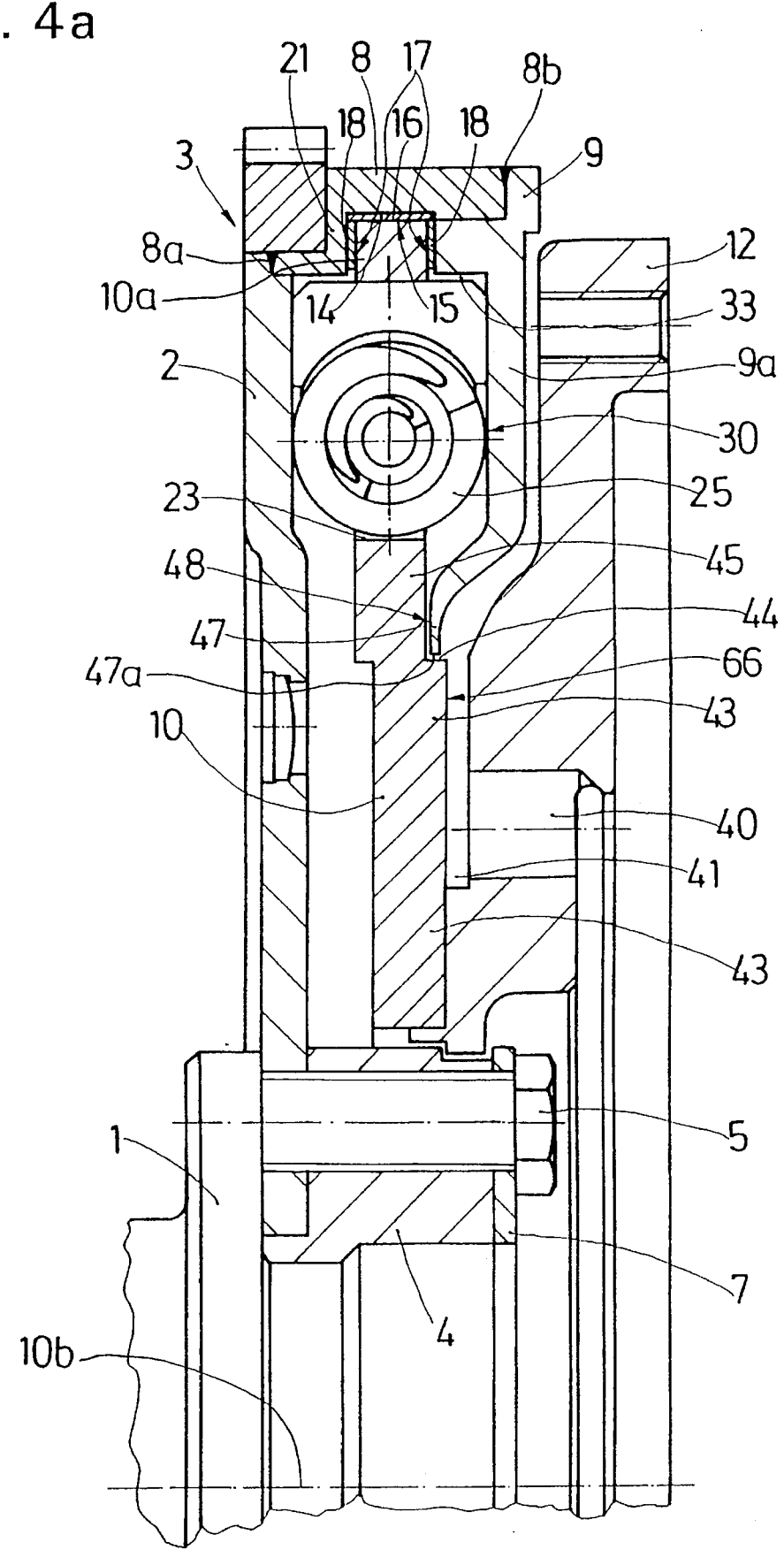
FIG. 4a shows substantially the same view as FIG. 4, but shows additional details.

FIGS. 4 and 4a show another embodiment in which the radially inner end 47 of the cover plate 9 is preferably realized in such a manner so as to extend substantially parallel to the annular surface 44 of the hub disc 10. In accordance with one embodiment shown in FIG. 4a, the inner end 47 of cover plate 9 can preferably have a surface 47a which can be disposed substantially parallel to surface 44, thus forming a gap between surface 47a and surface 44. Further since there is essentially no shoulder 42 in this embodiment, portion 43 of the hub disc 10 can preferably have a substantially continuous surface which faces flywheel 12.

The further configuration of the flywheel assembly shown in FIGS. 4 and 4a can preferably be similar to that shown in FIGS. 1–2a, and will not be discussed further here.

Figure 5:
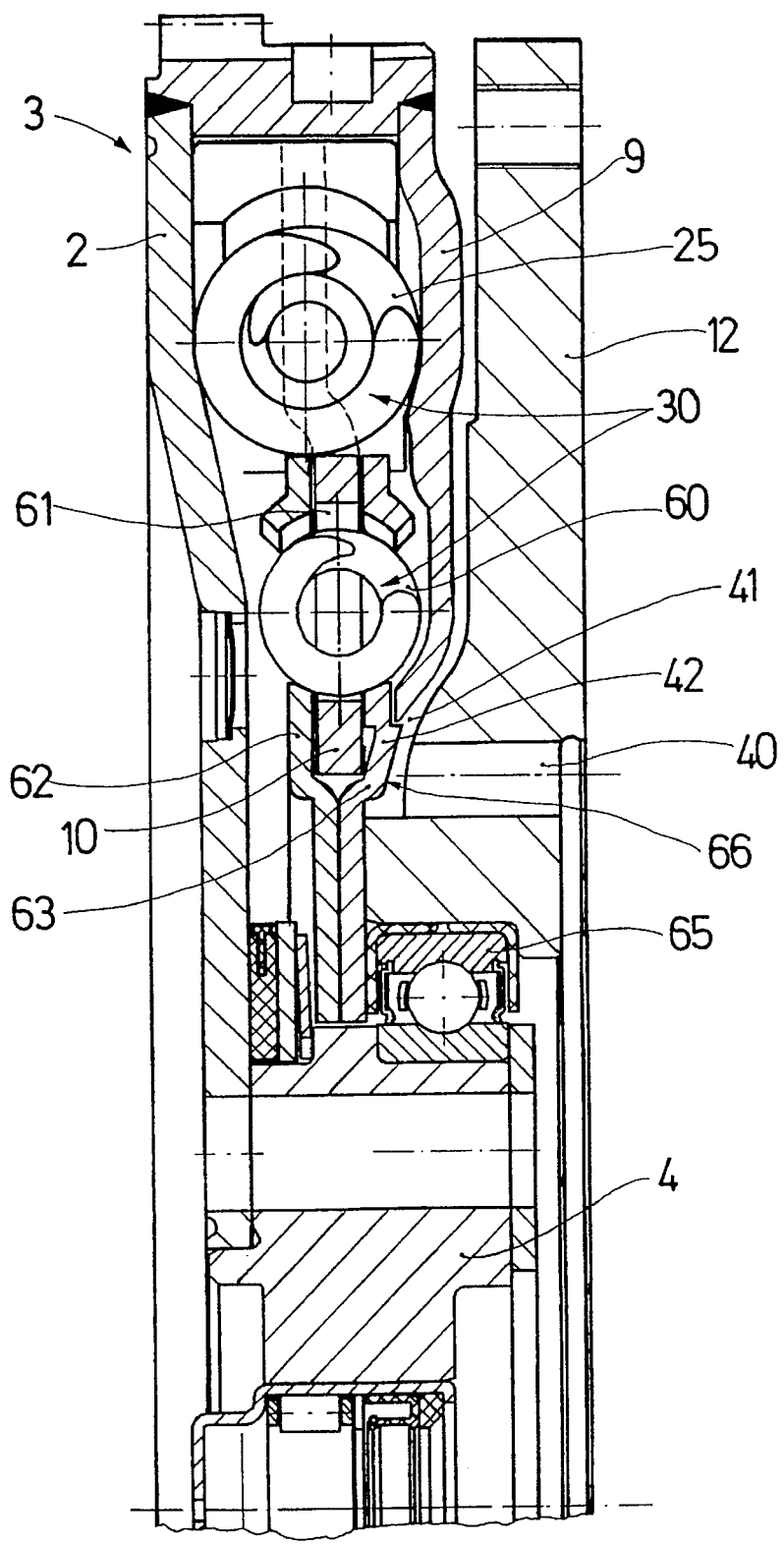
FIG. 5 shows a longitudinal section through an additional embodiment of the flywheel assembly with an additional set of springs for torsion damping.
Figure 5A:
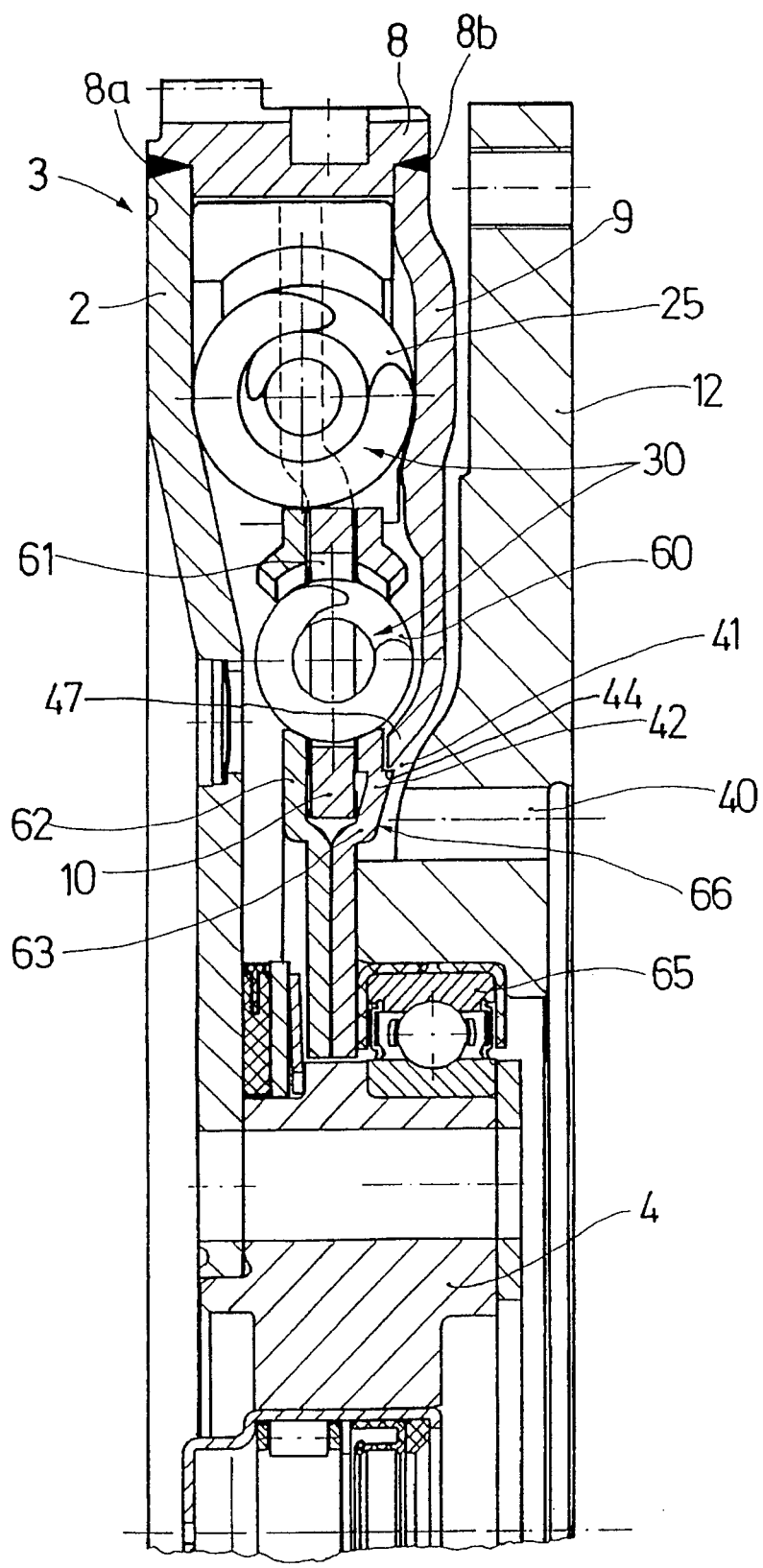
FIG. 5a shows substantially the same view as FIG. 5, but shows additional details.

FIGS. 5 and 5a show an additional embodiment of a flywheel assembly whose torsion damper 30, in contrast to those shown in FIGS. 1 through 4a, preferably has additional springs 60 preferably located radially inwardly from the springs 25. The hub disc 10 can preferably have recesses 61, preferably for receiving the additional springs 60. Further, the embodiment shown in FIGS. 5 and 5a also differs from the embodiments shown in FIGS. 1–4a in that the flywheel assembly can preferably include two cover plates 62, 63 preferably located on opposite sides of the hub disc 10.

The springs 60 can preferably be braced against the cover plates 62 and 63 on each side of the latter. The cover plates 62 and 63 can preferably be fastened to the second flywheel 12, which flywheel 12 can be mounted on the mounting flange 4, preferably by means of a mounting element 65.

In the flywheel assembly shown in FIGS. 5 and 5a, the shoulder 42 described in detail above with regard to FIGS. 1–3a can preferably be formed on the cover plate 63 adjacent to the second flywheel 12, and can be located radially outward of ventilation opening 40. With respect to the function of the air channel 41, the cover plate 63 of this flywheel assembly preferably corresponds to the hub disc 10 of the flywheel assembly shown in FIGS. 1 through 4a, in that both elements can preferably act as a torque transformer 66 for the second flywheel 12.

In other words, and in accordance with one embodiment, cover plate 63 can preferably include shoulder 42, compared to the embodiments shown in FIGS. 1–3a wherein the shoulder 42 is formed on the hub disc 10. Similar to the embodiment shown in FIGS. 4 and 4a, the cover plate 9 can preferably have the radially inner end 47 (see FIG. 5a), and shoulder 42 can preferably have the annular surface 44, the radially inner end 47 essentially not contacting the annular surface 44. In accordance with an alternative embodiment, end 47 may contact surface 44.

In accordance with one embodiment shown in FIG. 5a, the flywheel assembly can include an annular primary carrier 8 similar to that shown in FIGS. 1–4a, which carrier 8 can preferably be fastened on one end to primary plate 2 by means of weld 8a (see FIG. 5a), and on the other end can be fastened to cover plate 9 by means of weld 8b (see FIG. 5a).

With respect to the further configuration of the flywheel assembly and the air channel 41, this design essentially corresponds to those shown in FIGS. 1 through 4a and thus will not be discussed in greater detail.

Figure 6:
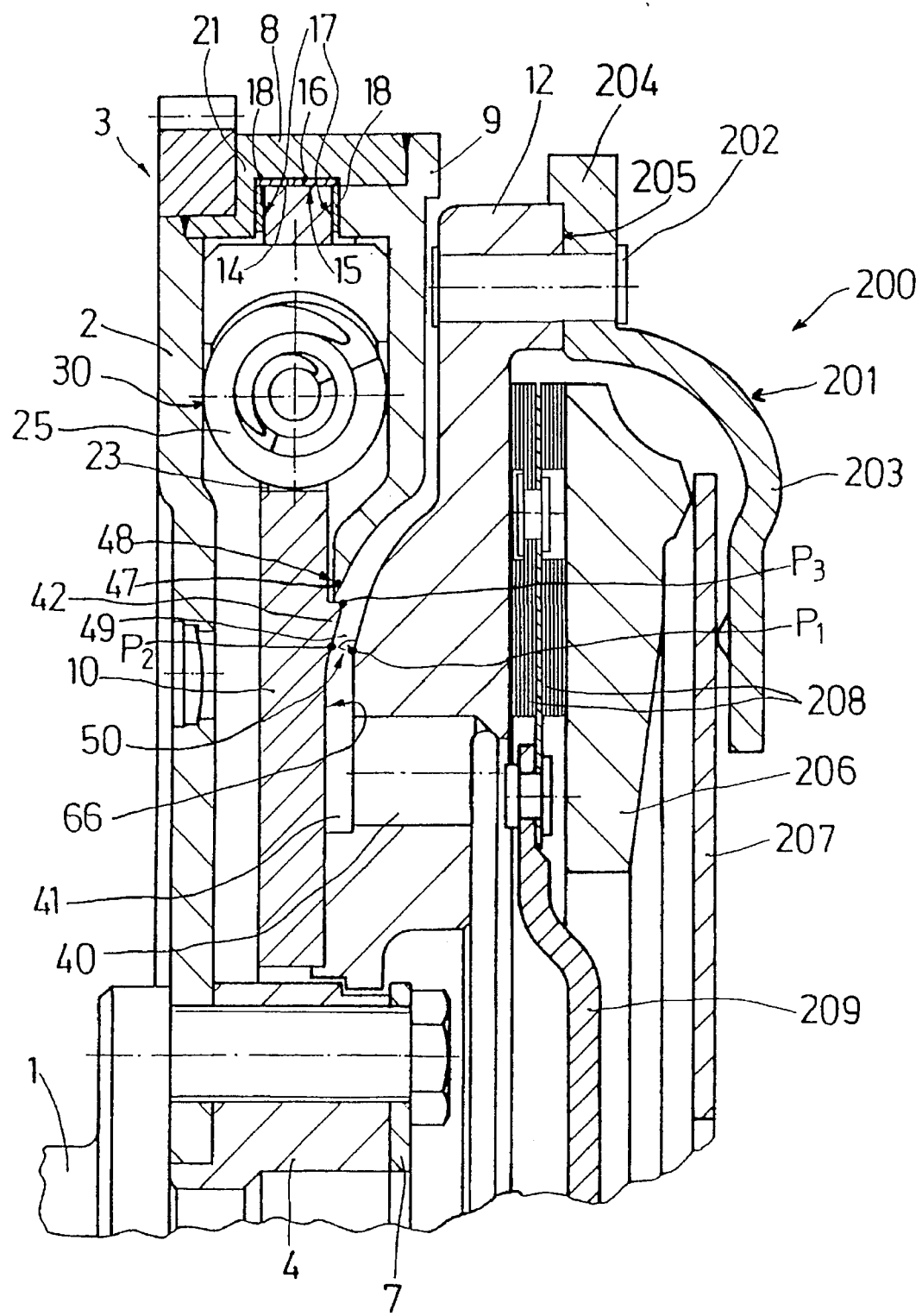
FIG. 6 shows the embodiment of FIGS. 1 and 1a in combination with a friction clutch.

FIG. 6 shows a further depiction of the flywheel assembly shown in FIGS. 1 and 1a, in combination with a friction clutch 200. It should be understood that the friction clutch 200 shown in FIG. 6 can also be utilized with the embodiments shown in FIGS. 2–5a. In accordance with the embodiment shown in FIG. 6, the friction clutch 200 can preferably include a pressure plate 201, which pressure plate 201 can be releasably fastened to the second flywheel 12 by means of fasteners 202. The fraction clutch 200 can also include a housing 203, which housing 203 can be equipped with a flange 205. The flange 205 can preferably extend radially outward and can be in contact with a corresponding radial surface 205 of the flywheel 12.

The pressure plate 201 can preferably include a thrust plate 206, which thrust plate 206 can be connected so that it is essentially torsionally stationary but can move axially, preferably with respect to the clutch housing 203. The thrust plate 206 can preferably be pressurized by a membrane spring 207, which membrane spring 207 can be braced both on the thrust plate 206 and also on the clutch housing 203. The thrust plate 206, preferably by means of the membrane spring 207, can engage friction linings 208 of a clutch disc 209 with the rotating flywheel 12, thereby also causing the clutch disc 209 to rotate. The clutch disc 209 can then in turn cause a shaft of a transmission (not shown here) to rotate with the engine.

Figure 7:
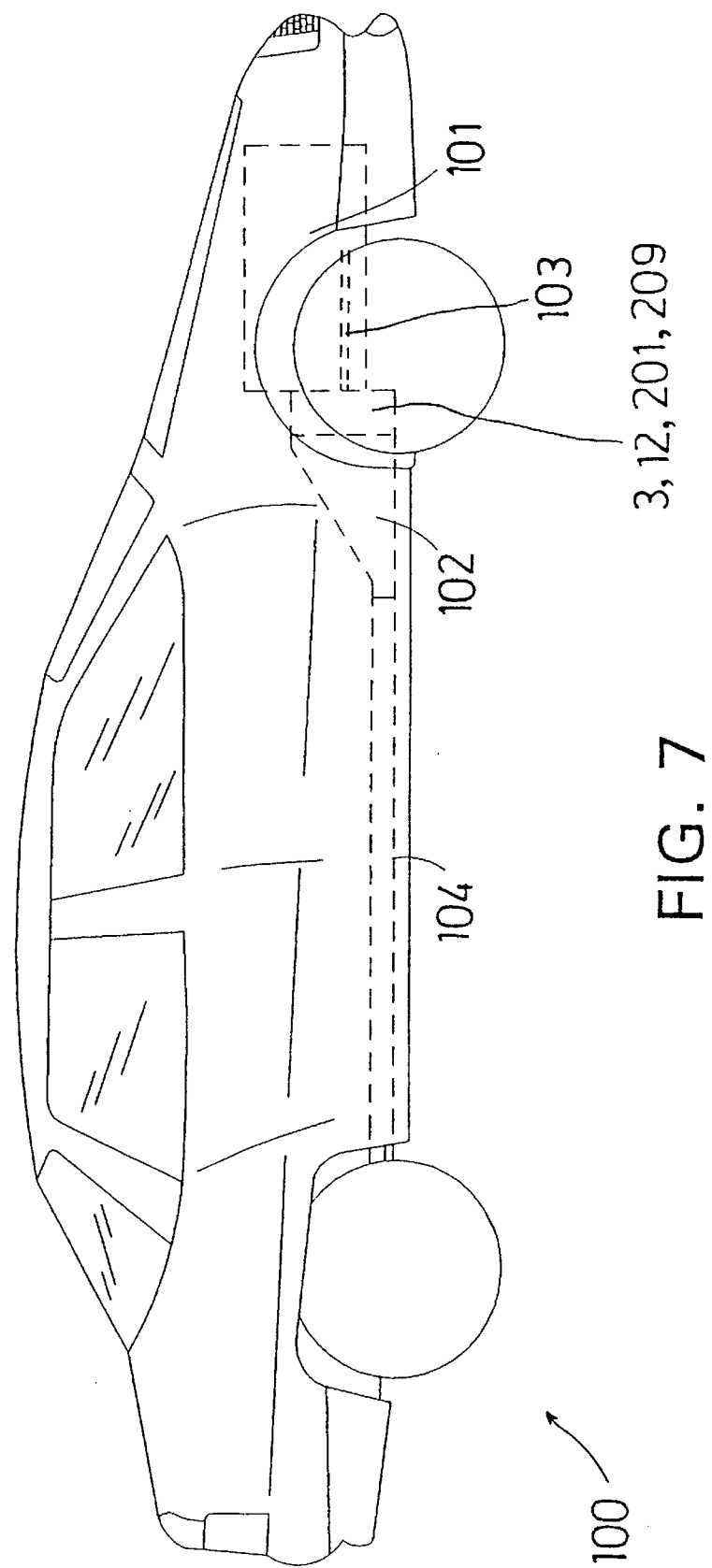
FIG. 7 shows a typical automobile incorporating the present invention.

FIG. 7 shows what could be considered to be a typical automobile or motor vehicle 100, which automobile 100 can preferably include an internal combustion engine 101, mounted in a forward portion thereof. The combustion engine 101 can preferably have a crankshaft 103 for outputting mechanical rotary power generated by the engine 101. The automobile 100 can also include a transmission 102 for transmitting mechanical power from the crankshaft 103 of the engine 101 to the wheels, via a drive shaft 104. If the automobile 100 has a manual transmission 102, the flywheels 3, 12, pressure plate 201, and clutch disc 209 of the present invention may also be included for engaging the transmission 102 with the engine 101.

One feature of the invention resides broadly in the flywheel assembly having a first flywheel which is detachably connected to the crankshaft of a combustion engine, a second flywheel which can be rotated relative to the first flywheel and a torque transformer, such as a hub disc, which is located in a chamber between the two flywheels, which chamber is filled with a viscous medium and which torque transformer is equipped with a torsion damping unit, whereby the chamber is defined on that side facing the second flywheel by a cover plate which encloses an air channel between it and the second flywheel, which air channel extends radially outward from a ventilation opening in the second flywheel, characterized by the fact that the torque transformer 66 is provided with an annular surface 44 which extends preferably in the axial direction and, relative to the second flywheel 12, with a portion 45 lying radially outside the annular surface 44, is recessed in relation to the annular surface 44, the cover plate 9 extends with its radially inner end 47 in the radial direction to the annular surface 44 and in the axial direction to the radially outer portion 45 of the torque transformer 66 and the annular surface 44 determines the maximum radial distance from the torque transformer 66 to the ventilation opening 40 for the change of direction of the air channel 41.

Another feature of the invention resides broadly in the flywheel assembly with a change of direction of the air gap on that side of the second flywheel facing the first flywheel by means of a corresponding shaping of the second flywheel, characterized by the fact that the annular surface 44 is realized on the radially outer end of an encircling shoulder 42 which protrudes at an angle with respect to the radially inner portion 43 of the torque transformer 66, by means of which the air channel 41, radially inward of the annular surface 44 and in the longitudinal direction of the shoulder 42, after a change in direction caused by a reduction in the cross section away from the torque transformer 66, runs almost parallel to the shoulder 42.

Yet another feature of the invention resides broadly in the flywheel assembly characterized by the fact that that point P1 at which the change in direction of the air channel 41 on the second flywheel 12 occurs, can be mapped to a point P2 by means of a projection to the shoulder 42 of the torque transformer 66 perpendicular to the course of the air channel 41 downstream of the change in direction, which point P2, when the air flow velocity remains below the speed of sound, is recessed radially inward from a point P3 of the shoulder 42 at which that portion of the shoulder 42 protruding at an angle from the torque transformer 66 reaches the annular surface 44.

Still another feature of the invention resides broadly in the flywheel assembly characterized by the fact that the point P1, at which the change in direction of the air channel 41 on the second flywheel 12 occurs, can be mapped to a point P2 by means of a projection to the shoulder 42 of the torque transformer (66) perpendicular to the course of the air channel 41 downstream of the change in direction, which point P2, when the air flow velocity reaches the speed of sound, coincides with the point P3 of the shoulder 42 at which that portion of the shoulder 42 protruding at an angle from the torque transformer 66 reaches the annular surface 44.

A further feature of the invention resides broadly in the flywheel assembly characterized by the fact that the angle at which the shoulder 42 runs in relation to the opposite wall of the air channel 41 formed on the second flywheel 12 preferably lies in a range between 4° and 10°.

Another feature of the invention resides broadly in the flywheel assembly characterized by the fact that the distance between the ventilation opening 40 and the point at which the shoulder 42 extends toward the inner portion 43 of the torque transformer 66 is a specified minimum distance.

Yet another feature of the invention resides broadly in the flywheel assembly characterized by the fact that the portion 45 of the torque transformer 66 radially outward from the annular surface 44 is radially recessed with respect to the portion (43) of the torque transformer 66 radially inward from the annular surface 44 relative to the second flywheel 12 to form the annular surface Still another feature of the invention resides broadly in the flywheel assembly, characterized by the fact that the cover plate 9 forms an acute angle at its radially inward end 47.

A further feature of the invention resides broadly in the flywheel assembly characterized by the fact that the cover plate 9 has at its radially inward end 47 a gap seal 48 which follows the contour of the annular surface 44.

Another feature of the invention resides broadly in the flywheel assembly characterized by the fact that the air channel 41 steadily constricts as it extends radially outward downstream of the gap seal 48.

Some examples of transmissions in which the present invention may be incorporated may be disclosed by the following U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies which could possibly be used in conjunction with the present invention may be disclosed in the following U.S. Pat. No. 4,684,007 to Maucher, entitled "Clutch Plate"; U.S. Pat. No. 4,635,780 to Wiggan, entitled "Clutch Disc for a Motor Vehicle Friction clutch"; and U.S. Pat. No. 4,651,857 to Schraut et al., entitled "Clutch Disc Unit for a Motor Vehicle Clutch".

Some examples of two-mass flywheels and the components thereof which may incorporate the present invention therein may be disclosed by the following U.S. Pat. No. 5,103,688 to Kuhne, entitled "Two-Mass Flywheel"; U.S. Pat. No. 4,777,843 to Bopp, entitled "Two-Mass Flywheel Assembly With Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the. Declaration attached hereto, are hereby incorporated by reference as if set forth in their entirety herein.

The corresponding foreign patent publication applications, namely, Federal Republic of Germany Patent Application No. P 44 05 384.3, filed on Feb. 19, 1994, having inventors Andreas Gabduet, Joachim Lindner, Bernhard Schierling, Bernd Stockmann, and Jörg Sudau, and DE-OS P 44 05 384.3 and DE-PS P 44 05 384.3, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A flywheel assembly for an internal combustion engine of a motor vehicle for transmitting mechanical rotary power from an internal combustion engine to a transmission, said flywheel assembly comprising:

a first flywheel portion;

a second flywheel portion disposed adjacent said first flywheel portion;

said first flywheel portion comprising means for non-rotationally connecting said first flywheel portion to a crankshaft of an internal combustion engine;

said first flywheel portion being rotatable about an axis of rotation, said axis of rotation defining an axial direction parallel to said axis of rotation;

said second flywheel portion being rotatable about said axis of rotation;

hub disc means for connecting said first flywheel portion and said second flywheel portion to one another, and for rotating said second flywheel portion with said first flywheel portion;

a cover plate disposed between said second flywheel portion and said hub disc means, said cover plate comprising an outer circumferential portion and an inner circumferential portion, said inner circumferential portion being disposed immediately adjacent said hub disc means;

said first flywheel portion and said cover plate defining a chamber therebetween, at least a portion of said chamber comprising a viscous medium;

at least a portion of said hub disc means being disposed within said chamber;

said cover plate, said second flywheel portion and said hub disc means together defining an air channel;

said hub disc means further comprising means for deflecting the air in said air channel away from said inner circumferential portion of said cover plate;

said means for deflecting comprising an annular surface, said inner circumferential portion of said cover plate being disposed immediately adjacent said annular surface to form a seal for sealing said chamber; and said annular surface being oriented substantially parallel to the axis of rotation and extending in a direction towards said second flywheel portion.

2. The flywheel assembly according to claim 1 wherein said second flywheel portion comprises at least one orifice disposed radially inwardly of said seal, said at least one orifice being in fluid communication with said air channel.

3. The flywheel assembly according to claim 2 wherein:

said hub disc means comprises:

an inner portion disposed adjacent said at least one orifice and an outer portion disposed at a substantial distance from said at least one orifice; and an area disposed between said inner portion of said hub disc means and said outer portion of said hub disc means;

said annular surface is disposed at said area between said inner portion of said hub disc means and said outer portion of said hub disc means; and said outer portion of said hub disc means being recessed in the axial direction towards said first flywheel portion to form said annular surface.

4. The flywheel assembly according to claim 3 wherein:

said second flywheel portion comprises:

a first side and a second side disposed opposite one another, said first side facing said hub disc means and said second side for facing a clutch disc of a friction clutch;

an inner portion disposed adjacent said inner portion of said hub disc means, said inner portion of said second flywheel portion comprising said at least one orifice; and a portion of said first side of said second flywheel portion;

said means for deflecting comprises:

a contoured portion disposed on said portion of said first side of said second flywheel portion, said contoured portion being further disposed axially adjacent said seal;

said contoured portion defining a portion of said air channel; and said contoured portion extending radially outwardly and being curved in a direction away from said hub disc means.

5. The flywheel assembly according to claim 4 wherein:

said means for deflecting further comprises a shoulder extending circumferentially about said hub disc means, said shoulder projecting away from a locus of points about said inner portion of said hub disc means and at an angle with respect to said inner portion of said hub disc means; and said annular surface extends from said area between said inner portion of said hub disc means and said outer portion of said hub disc means to said shoulder, said annular surface intersecting with said shoulder at a radially outermost locus of points of said shoulder.

6. The flywheel assembly according to claim 5 wherein:

said hub disc means comprises a hub disc;

said shoulder and said annular surface are both integral with, end homogeneous with, said hub disc.

7. The flywheel assembly according to claim 6 wherein:

said shoulder comprises a surface facing said contoured portion of said second flywheel portion, said surface extending from said locus of points about said inner portion of said hub disc to said annular surface;

said surface of said shoulder being disposed substantially parallel to a portion of said contoured portion;

said air channel comprises a first part and a second part, said first part extending from said at least one orifice to said locus of points about said inner portion of said hub disc;

said second part extends from said locus of points on said inner portion of said hub disc to said radially outermost locus of points of said shoulder;

said first part and said second part each have a cross-sectional area defined parallel to the axis of rotation, said cross-sectional area of said second part of said air channel being less than said cross-sectional area of said first part of said air channel;

said inner circumferential portion of said cover plate comprises an acute portion, said acute portion being disposed immediately adjacent said annular surface to form said seal;

said at least one orifice extends from said first side of said second flywheel portion to said second side of said second flywheel portion;

said angle of said shoulder with respect to said inner portion of said hub disc is between about 4° and about 10°;

the distance between said locus of points on said inner portion of said hub disc and said at least one orifice is a predetermined minimum distance for minimizing turbulence in said first part of said air channel;

said second flywheel portion further comprises an outer portion disposed about said inner portion of said second flywheel portion, said outer portion defining a perimeter of said second flywheel portion;

said air channel further comprises a third part extending from said radially outermost locus of points of said shoulder to said perimeter of said second flywheel portion, said third part having a cross-sectional area defined parallel to the axis of rotation;

said cross-sectional area of said third part decreases in a radially outward direction from said seal;

said locus of points on said hub disc is a first locus of points;

said contoured portion of said second flywheel portion originates at a second locus of points on said second flywheel portion, said second locus of points being points at which the air in said first part of said air channel changes direction along said second flywheel portion;

said first locus of points being disposed on said hub disc on a line perpendicular to a tangent line drawn along said portion of said contoured portion, said tangent lines intersecting said second locus of points;

said first locus of points being disposed radially inward from said radially outermost locus of points;

said first locus of points and said second locus of points are disposed at substantially equal radial distances from the axis of rotation;

the air, upon exiting said second part of said air channel has a velocity below the speed of sound;

said flywheel assembly further comprises an annular carrier disposed substantially perpendicular to said first and second flywheel portions;

said annular carrier has a first end and a second end;

said first end of said annular carrier is attached to said first flywheel portion, and said second end of said annular carrier is attached to said outer circumferential portion of said cover plate;

said inner circumferential portion of said cover plate is disposed at an angle With respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

8. The flywheel assembly according to claim 6 wherein:

said shoulder comprises a surface facing said inner portion of said second flywheel portion, said surface extending from said locus of points on said inner portion of said hub disc to said annular surface;

said air channel comprises a first part and a second part, said first part extending from said at least one orifice to said locus of points on said inner portion of said hub disc;

said second part extends from said locus of points on said inner portion of said hub disc to said radially outermost locus of points of said shoulder;

said first part and said second part each have a cross-sectional area defined parallel to the axis of rotation, said cross-sectional area of said second part of said air channel being substantially less than said cross-sectional area of said first part of said air channel;

said inner circumferential portion of said cover plate comprises an acute portion, said acute portion being disposed immediately adjacent said annular surface to form said seal;

said at least one orifice extends from said first side of said second flywheel portion to said second side of said second flywheel portion;

said angle of said shoulder with respect to said inner portion of said hub disc is between about 4° and about 10°;

the distance between said locus of points on said inner portion of said hub disc and said at least one orifice is a predetermined minimum distance for minimizing turbulence in said first part of said air channel;

said second flywheel portion further comprises an outer portion disposed about said inner portion of said second flywheel portion, said outer portion defining a perimeter of said second flywheel portion;

said air channel further comprises a third part extending from said radially outermost locus of points of said shoulder to said perimeter of said second flywheel portion, said third part having a cross-sectional area defined parallel to the axis of rotation;

said cross-sectional area of said third part decreases in a radially outward direction from said seal;

said locus of points on said hub disc is a first locus of points;

said contoured portion of said second flywheel portion originates at a second locus of points on said second flywheel portion, said second locus of points being points at which the air in said first part of said air channel changes direction along said second flywheel portion;

said second locus of points and said radially outermost locus of points are disposed at substantially equal radial distances from the axis of rotation;

said radially outermost locus of points each being disposed on a line perpendicular to a tangent line drawn along said contoured portion, said tangent lines intersecting said second locus of points;

said first locus of points being disposed radially inward from said radially outermost locus of points;

the air, upon exiting said second part of said air channel has a velocity substantially equal to the speed of sound;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said cover plate;

said inner circumferential portion of said cover plate is disposed at an angle with respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

9. The flywheel assembly according to claim 4 wherein:

said hub disc means comprises a hub disc;

said outer portion of said hub disc is disposed closer to said first flywheel portion than said is inner portion of said hub disc;

said inner portion of said hub disc comprises a first surface facing said second flywheel portion, said first surface defining a portion of said air channel;

said outer portion of said hub disc comprises a second surface facing said cover plate, said first surface and said second surface both being perpendicular to the axis of rotation; and said annular surface extends from said second surface to said first surface.

10. The flywheel assembly according to claim 9 wherein:

said annular surface intersects said first surface at a first locus of points;

said second flywheel portion further comprises an outer portion disposed about said inner portion of said second flywheel portion, said outer portion defining a perimeter of said second flywheel portion;

said air channel comprises a first part extending between said at least one orifice and said first locus of points;

said first part of said air channel has a constant cross-sectional area defined parallel to the axis of rotation;

said air channel comprises a second part extending from said first locus of points to said perimeter of said second flywheel portion, said second part having a decreasing cross-sectional area in a radially outward direction from said seal;

said inner circumferential portion of said cover plate comprises one of:

an acute portion disposed immediately adjacent said annular surface to form said seal; and a portion having a surface disposed parallel to said annular surface, said surface being disposed immediately adjacent said annular surface to form said seal;

said at least one orifice extends from said first side of said second flywheel portion to said second side of said second flywheel portion;

the distance between said first locus of points and said at least one orifice is a predetermined minimum distance for minimizing turbulence in said first part of said air channel;

said contoured portion of said second flywheel portion originates at a second locus of points about said second flywheel portion, said second locus of points being points at which the air in said first part of said air channel changes direction along said second flywheel portion;

said first locus of points and said second locus of points being disposed at substantially equal radial distances from the axis of rotation;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said cover plate;

said inner circumferential portion of said cover plate is disposed at an angle with respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

11. The flywheel assembly according to claim 2 wherein:

said cover plate is a first cover plate;

said hub disc means comprises:

a second cover plate and a third cover plate disposed opposite one another;

a hub disc disposed between said second cover plate and said third cover plate;

said first cover plate is disposed between said second cover plate and said second portion of said flywheel;

said third cover plate is disposed between said hub disc and said first portion of said flywheel;

said second cover plate comprises:

said annular surface;

an inner portion disposed adjacent said at least one orifice and an outer portion disposed a substantial distance from said at least one orifice;

an area disposed between said inner portion of said second cover plate and said outer portion of said second cover plate;

said annular surface is disposed at said area between said inner portion of said second cover plate and said outer portion of said second cover plate;

said outer portion of said second cover plate being recessed in the axial direction towards said first flywheel portion to form said annular surface;

said second flywheel portion comprises:

a first side and a second side disposed opposite one another, said first side facing said second cover plate and said second side for facing a clutch disc of a friction clutch;

an inner portion disposed adjacent said inner portion of said second cover plate, said inner portion of said second flywheel portion comprising:

said at least one orifice; and a portion of said first side of said second flywheel portion;

said means for deflecting comprises a contoured portion disposed on said portion of said first side of said second flywheel portion, said contoured portion being disposed axially adjacent said seal;

said contoured portion defining a portion of said air channel;

said contoured portion extending radially outwardly and being curved in a direction away from said second cover plate;

said means for deflecting further comprises a shoulder extending circumferentially about said second cover plate, said shoulder projecting away from said inner portion of said second cover plate at an angle with respect to said inner portion of said second cover plate;

said annular surface and said shoulder both being integral with, and homogeneous with, said second cover plate;

said annular surface extends from said area between said inner portion of said second cover plate and said outer portion of said second cover plate to said shoulder, said annular surface intersecting with said shoulder at a radially outermost locus of points of said shoulder;

said inner circumferential portion of said first cover plate comprises an acute portion, said acute portion being disposed immediately adjacent said annular surface to form said seal;

said at least one orifice extends from said first side of said second flywheel portion to said second side of said second flywheel portion;

said second flywheel portion further comprises an outer portion disposed about said inner portion of said second flywheel portion, said outer portion comprising a perimeter of said second flywheel portion;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said first cover plate;

said inner circumferential portion of said first cover plate is disposed at an angle with respect to said outer circumferential portion of said first cover plate, said inner circumferential portion extending axially and radially inwardly towards said second cover plate;

said second cover plate, said third cover plate and said hub disc each comprise a plurality of openings disposed circumferentially about said second cover plate, said third cover plate and said hub disc, said openings of said second cover plate, said third cover plate and said hub disc all being circumferentially aligned with one another; and said flywheel assembly further comprises a plurality of springs, each of said plurality of springs being disposed in a corresponding one of said plurality of openings of said second cover plate; said third cover plate and said hub disc.

12. A transmission system for a motor vehicle, said transmission system comprising:

a flywheel assembly;

a pressure plate releasably fastened to said flywheel assembly;

a clutch disc disposed between said pressure plate and said flywheel assembly;

said pressure plate being axially movable and for applying pressure to said clutch disc to engage said clutch disc with said flywheel assembly;

said clutch disc comprising friction linings for contacting said pressure plate and said flywheel assembly during engagement of said clutch disc with said flywheel assembly;

said flywheel assembly comprising:

a first flywheel portion;

a second flywheel portion disposed adjacent said first flywheel portion;

said first flywheel portion comprising means for non-rotationally connecting said first flywheel portion to a crankshaft of an internal combustion engine;

said first flywheel portion being rotatable about an axis of rotation, said axis of rotation defining an axial direction parallel to said axis of rotation;

said second flywheel portion being rotatable about said axis of rotation;

hub disc means for connecting said first flywheel portion and said second flywheel portion to one another, and for rotating said second flywheel portion with said first flywheel portion;

a cover plate disposed between said second flywheel portion and said hub disc means, said cover plate comprising an outer circumferential portion and an inner circumferential portion, said inner circumferential portion being disposed immediately adjacent said hub disc means;

said first flywheel portion and said cover plate defining a chamber therebetween, at least a portion of said chamber comprising a viscous medium;

at least a portion of said hub disc means being disposed within said chamber;

said cover plate, said second flywheel portion and said hub disc means together defining an air channel;

said hub disc means further comprising means for deflecting the air in said air channel away from said inner circumferential portion of said cover plate;

said means for deflecting comprising an annular surface, said inner circumferential portion of said cover plate being disposed immediately adjacent said annular surface to form a seal for sealing said chamber;

said annular surface being oriented substantially parallel to the axis of rotation and extending in a direction towards said second flywheel portion; and said second flywheel portion comprising at least one orifice disposed radially inwardly of said seal, said at least one orifice being in fluid communication with said air channel.

13. The transmission system according to claim 12 wherein:

said hub disc means comprises:

an inner portion disposed adjacent said at least one orifice and an outer portion disposed at a substantial distance from said at least one orifice; and an area disposed between said inner portion of said hub disc means and said outer portion of said hub disc means;

said annular surface is disposed at said area between said inner portion of said hub disc means and said outer portion of said hub disc means;

said outer portion of said hub disc means being recessed in the axial direction towards said first flywheel portion to form said annular surface;

said second flywheel portion comprises:

a first side and a second side disposed opposite one another, said first side facing said hub disc means and said second side for facing a clutch disc of a friction clutch;

an inner portion disposed adjacent said inner portion of said hub disc means, said inner portion of said second flywheel portion comprising:

said at least one orifice; and a portion of said first side of said second flywheel portion;

said means for deflecting comprises a contoured portion disposed on said portion of said first side of said second flywheel portion, said contoured portion being further disposed axially adjacent said seal;

said contoured portion defining a portion of said air channel; and said contoured portion extending radially outwardly and being curved in a direction away from said hub disc means.

14. The transmission system according to claim 13 wherein:

said means for deflecting further comprises a shoulder extending circumferentially about said hub disc means, said shoulder projecting away from a locus of points about said inner portion of said hub disc means and at an angle with respect to said inner portion of said hub disc means;

said annular surface extends from said area between said inner portion of said hub disc means and said outer portion of said hub disc means to said shoulder, said annular surface intersecting with said shoulder at a radially outermost locus of points of said shoulder;

said hub disc means comprises a hub disc; and said shoulder and said annular surface are both integral with, and homogeneous with, said hub disc.

15. The transmission system according to claim 14 wherein:

said shoulder comprises a surface facing said contoured portion of said second flywheel portion, said surface extending from said locus of points about said inner portion of said hub disc to said annular surface;

said surface of said shoulder being disposed substantially parallel to a portion of said contoured portion;

said air channel comprises a first part and a second part, said first part extending from said at least one orifice to said locus of points about said inner portion of said hub disc;

said second part extends from said locus of points about said inner portion of said hub disc to said radially outermost locus of points of said shoulder;

said first part and said second part each have a cross-sectional area defined parallel to the axis of rotation, said cross-sectional area of said second part of said air channel being less than said cross-sectional area of said first part of said air channel;

said inner circumferential portion of said cover plate comprises an acute portion, said acute portion being disposed immediately adjacent said annular surface to form said seal;

said at least one orifice extends from said first side of said second flywheel portion to said second side of said second flywheel portion;

said angle of said shoulder with respect to said inner portion of said hub disc is between about 4° and about 10°;

the distance between said locus of points about said inner portion of said hub disc and said at least one orifice is a predetermined minimum distance for minimizing turbulence in said first part of said air channel;

said second flywheel portion further comprises an outer portion disposed about said inner portion of said second flywheel portion, said outer portion defining a perimeter of said second flywheel portion;

said air channel further comprises a third part extending from said radially outermost locus of points of said shoulder to said perimeter of said second flywheel portion, said third part having a cross-sectional area defined parallel to the axis of rotation;

said cross-sectional area of said third part decreases in a radially outward direction from said seal;

said locus of points on said hub disc is a first locus of points;

said contoured portion of said second flywheel portion originates at a second locus of points about said second flywheel portion, said second locus of points being points at which the air in said first part of said air channel changes direction along said second flywheel portion;

said first locus of points each being disposed on said hub disc on a line perpendicular to a tangent line drawn along said portion of said contoured portion, said tangent lines intersecting said second locus of points;

said first locus of points being disposed radially inward from said radially outermost locus of points;

said first locus of points and said second locus of points are disposed at substantially equal radial distances from the axis of rotation;

the air, upon exiting said second part of said air channel has a velocity below the speed of sound;

said flywheel assembly further comprises an annular carrier disposed substantially perpendicular to said first and second flywheel portions;

said annular carrier has a first end and a second end;

said first end of said annular carrier is attached to said first flywheel portion, and said second end of said annular carrier is attached to said outer circumferential portion of said cover plate;

said inner circumferential portion of said cover plate is disposed at an angle with respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

16. The transmission system according to claim 14 wherein:

said shoulder comprises a surface facing said inner portion of said second flywheel portion, said surface extending from said locus of points on said inner portion of said hub disc to said annular surface;

said air channel comprises a first part and a second part, said first part extending from said at least one orifice to said locus of points on said inner portion of said hub disc;

said second part extends from said locus of points on said inner portion of said hub disc to said radially outermost locus of points of said shoulder;

said first part and said second part each have a cross-sectional area defined parallel to the axis of rotation, said cross-sectional area of said second part of said air channel being substantially less than said cross-sectional area of said first part of said air channel;

said inner circumferential portion of said cover plate comprises an acute portion, said acute portion being disposed immediately adjacent said annular surface to form said seal;

said at least one orifice extends from said first side of said second flywheel portion to said second side of said second flywheel portion;

said angle of said shoulder with respect to said inner portion of said hub disc is between about 4° and about 10°;

the distance between said locus of points on said inner portion of said hub disc and said et least one orifice is a predetermined minimum distance for minimizing turbulence in said first part of said air channel;

said second flywheel portion further comprises an outer portion disposed about said inner portion of said second flywheel portion, said outer portion defining a perimeter of said second flywheel portion;

said air channel further comprises a third part extending from said radially outermost locus of points of said shoulder to said perimeter of said second flywheel portion, said third part having a cross-sectional area defined parallel to the axis of rotation;

said cross-sectional area of said third part decreases in a radially outward direction from said seal;

said locus of points on said hub disc is a first locus of points;

said contoured portion of said second flywheel portion originates at a second locus of points about said second flywheel portion, said second locus of points points at which the air in said first part of said air channel changes direction along said second flywheel portion;

said second locus of points and said radially outermost locus of points are disposed at substantially equal radial distances from the axis of rotation;

said radially outermost locus of points each being disposed on a first perpendicular to a tangent line drawn along said contoured portion, said tangent lines intersecting said second locus of points;

said first locus of points being disposed radially inward from said radially outermost locus of points;

the air, upon exiting said second part of said air channel has a velocity substantially equal to the speed of sound;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said cover plate;

said inner circumferential portion of said cover plate is disposed at an angle with respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

17. The transmission system according to claim 13 wherein:

said hub disc means comprises a hub disc;

said outer portion of said hub disc is disposed closer to said first flywheel portion than is said inner portion of said hub disc;

said inner portion of said hub disc comprises a first surface facing said second flywheel portion, said first surface defining a portion of said air channel;

said outer portion of said hub disc comprises a second surface facing said cover plate, said first surface and said second surface both being perpendicular to the axis of rotation;

said annular surface extends from said second surface to said first surface;

said annular surface intersects said first surface at a first locus of points;

said second flywheel portion further comprises an outer portion disposed about said inner portion of said second flywheel portion, said outer portion defining a perimeter of said second flywheel portion;

said air channel comprises a first part extending between said at least one orifice and said first locus of points;

said first part of said air channel has a constant cross-sectional area defined parallel to the axis of rotation;

said air channel comprises a second part extending from said first locus of points to said perimeter of said second flywheel portion, said second part having a decreasing cross-sectional area in a radially outward direction from said seal;

said inner circumferential portion of said cover plate comprises one of:
 an acute portion disposed immediately adjacent said annular surface to form said seal; and
 a portion having a surface disposed parallel to said annular surface, said surface being disposed immediately adjacent said annular surface to form said seal;

said at least one orifice extends from said first side of said second flywheel portion to said second side of said second flywheel portion;

the distance between said first locus of points and said at least one orifice is a predetermined minimum distance for minimizing turbulence in said first part of said air channel;

said contoured portion of said second flywheel portion originates at a second locus of points about said second flywheel portion, said second locus of points being points at which the air in said first part of said air channel changes direction along said second flywheel portion;

said first locus of points and said second locus of points being disposed at substantially equal radial distances from the axis of rotation;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said cover plate;

said inner circumferential portion of said cover plate is disposed at an angle with respect to said outer circumferential portion of said cover plate, said inner circumferential portion extending axially and radially inwardly towards said hub disc;

said hub disc comprises a plurality of openings disposed circumferentially about said hub disc; and said flywheel assembly further comprises a plurality of springs, each of said plurality of springs being disposed in a corresponding one of said plurality of openings.

18. The transmission system according to claim 12 wherein:

said cover plate is a first cover plate;

said hub disc means comprises:
 a second cover plate and a third cover plate disposed opposite one another;
 a hub disc disposed between said second cover plate and said third cover plate;

said first cover plate is disposed between said second cover plate and said second portion of said flywheel;

said third cover plate is disposed between said hub disc and said first portion of said flywheel;

said second cover plate comprises:
 said annular surface;
 an inner portion disposed adjacent said at least one orifice and an outer portion disposed a substantial distance from said at least one orifice;
 an area disposed between said inner portion of said second cover plate and said outer portion of said second cover plate;
 said annular surface is disposed at said area between said inner portion of said second cover plate and said outer portion of said second cover plate;
 said outer portion of said second cover plate being recessed in the axial direction towards said first flywheel portion to form said annular surface;

said second flywheel portion comprises:
 a first side end a second side disposed opposite one another, said first side facing said second cover plate and said second side for facing a clutch disc of a friction clutch;

an inner portion disposed adjacent said inner portion of said second cover plate, said inner portion of said second flywheel portion comprising:

said at least one orifice; and a portion of said first side of said second flywheel portion;

said means for deflecting comprises a contoured portion disposed on said portion of said first side of said second flywheel portion, said contoured portion being disposed axially adjacent said seal;

said contoured portion defining a portion of said air channel;

said contoured portion extending radially outwardly and being curved in a direction away from said second cover plate;

said means for deflecting further comprises a shoulder extending circumferentially about said second cover plate, said shoulder projecting away from said inner portion of said second cover plate at an angle with respect to said inner portion of said second cover plate;

said annular surface and said shoulder both being integral with, and homogeneous with, said second cover plate;

said annular surface extends from said area between said inner portion of said second cover plate and said outer portion of said second cover plate to said shoulder, said annular surface intersecting with said shoulder at a radially outermost locus of points of said shoulder;

said inner circumferential portion of said first cover plate comprises an acute portion, said acute portion being disposed immediately adjacent said annular surface to form said seal;

said at least one orifice extends from said first side of said second flywheel portion to said second side of said second flywheel portion;

said second flywheel portion further comprises an outer portion disposed about said inner portion of said second flywheel portion, said outer portion comprising a perimeter of said second flywheel portion;

said flywheel assembly further comprises an annular carrier disposed substantially perpendicular to said first and second flywheel portions;

said annular carrier has a first end and a second end;

said first end of said annular carrier is attached to said first flywheel portion and said second end of said annular carrier is attached to said outer circumferential portion of said first cover plate;

said inner circumferential portion of said first cover plate is disposed at an angle with respect to said outer circumferential portion of said first cover plate, said inner circumferential portion extending axially and radially inwardly towards said second cover plate;

said second cover plate, said third cover plate and said hub disc each comprise a plurality of openings disposed circumferentially about said second cover plate, said third cover plate and said hub disc, said openings of said second cover plate, said third cover plate and said hub disc all being circumferentially aligned with one another; and said flywheel assembly further comprises a plurality of springs, each of said plurality of springs being disposed in a corresponding one of said plurality of openings of said second cover plate, said third cover plate and said hub disc.

\* \* \* \* \*

UNITED STATES PATENT AND TRADEMARK OFFICE
CERTIFICATE OF CORRECTION

PATENT NO. : 5,597,059

DATED : January 28, 1997

INVENTOR(S) : Andreas GEBAUER, Joachim LINDNER, Bernhard SCHIERLING, Bernd STOCKMANN and Jürg SUDAU It is certified that error appears in the above-indentified patent and that said Letters Patent is hereby corrected as shown below:

In column 10, line 11, after the first occurrence of 'flange', delete "205." and insert --204.--.

In column 10, line 11, after the second occurrence of 'flange', delete "205" and insert --204--.

In column 11, line 48, after 'portion', delete "(43)" and insert --43--.

In column 12, line 32, after 'Andreas', delete "Gabduet," and insert --Gebauer,--.

In column 14, line 13, Claim 6, before 'homogeneous', delete "end" and insert --and--.

In column 22, line 43, Claim 16, after the second occurrence of 'said', delete "et" and insert --at--.

UNITED STATES PATENT AND TRADEMARK OFFICE
CERTIFICATE OF CORRECTION

PATENT NO. : 5,597,059

DATED : January 28, 1997

INVENTOR(S) : Andreas GEBAUER, Joachim LINDNER, Bernhard SCHIERLING, Bernd STOCKMANN and Jörg SUDAU It is certified that error appears in the above-indentified patent and that said Letters Patent is hereby corrected as shown below:

In column 22, line 62, Claim 16, after the first occurrence of 'points' delete the second occurrence of "points".

Signed and Sealed this

Third Day of June, 1997

BRUCE LEHMAN

*Attest:*

*Attesting Officer*   Commissioner of Patents and Trademarks